US012628221B2

(12) United States Patent (10) Patent No.: US 12,628,221 B2
Takada (45) Date of Patent: May 12, 2026

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Tomoyuki Takada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 17/929,667

(22) Filed: Sep. 2, 2022

(65) Prior Publication Data

US 2022/0418027 A1 Dec. 29, 2022

Related U.S. Application Data

(63) Continuation of application No. PCT/JP2021/004554, filed on Feb. 8, 2021.

(30) Foreign Application Priority Data

Mar. 5, 2020 (JP) ................................. 2020-038139

(51) Int. Cl.
*H04W 76/15* (2018.01)
*H04L 5/00* (2006.01)
*H04W 72/0453* (2023.01)

(52) U.S. Cl.
CPC ........... *H04W 76/15* (2018.02); *H04L 5/0048* (2013.01); *H04W 72/0453* (2013.01)

(58) Field of Classification Search
CPC ....... H04W 8/24; H04W 48/12; H04W 48/16; H04W 76/11; H04W 76/15; H04W 76/25; H04W 84/12

USPC .......................................... 370/328, 329, 338
See application file for complete search history.

(56) References Cited

U.S. PATENT DOCUMENTS

| | | | |
|---|---|---|---|
| 2016/0007275 A1 | 1/2016 | Park et al. | |
| 2018/0007561 A1 | 1/2018 | Adachi et al. | |
| 2018/0077723 A1 | 3/2018 | Adachi | |
| 2018/0098378 A1* | 4/2018 | Patil ...................... | H04W 48/12 |
| 2018/0110070 A1 | 4/2018 | Yoshimura et al. | |

(Continued)

FOREIGN PATENT DOCUMENTS

| | | |
|---|---|---|
| CN | 1567736 A | 1/2005 |
| CN | 109792736 A | 5/2019 |

(Continued)

OTHER PUBLICATIONS

Insun Jang, et al., Discussion on Multi-link Setup, doc.: IEEE 802.11-19 1509r5, Sep. 16, 2019.

(Continued)

*Primary Examiner* — Harun Chowdhury
(74) *Attorney, Agent, or Firm* — Canon U.S.A., Inc. IP Division

(57) ABSTRACT

A link is established between communication apparatuses 102 and 103 that can execute multi-link communication complying with an Institute of Electrical and Electronics Engineers (IEEE) 802.11 series standard via a frequency channel, and a media access control (MAC) frame in which information regarding a second link different from an established first link is included later than a field in which information regarding a service set identifier (SSID) is stored is communicated between the communication apparatuses 102 and 103.

9 Claims, 10 Drawing Sheets

(56) References Cited

U.S. PATENT DOCUMENTS

| | | | |
|---|---|---|---|
| 2019/0082373 A1 | 3/2019 | Patil | |
| 2021/0014911 A1* | 1/2021 | Patil | H04W 76/15 |
| 2021/0076437 A1* | 3/2021 | Kneckt | H04W 76/11 |
| 2021/0266998 A1* | 8/2021 | Ho | H04W 84/12 |

FOREIGN PATENT DOCUMENTS

| | | | |
|---|---|---|---|
| JP | 2012523202 A | 9/2012 | |
| JP | 2015537469 A | 12/2015 | |
| JP | WO2016178418 A1 | 11/2016 | |
| JP | 2018093255 A | 6/2018 | |
| JP | 2018527770 A | 9/2018 | |
| WO | 2016178418 A1 | 11/2016 | |

OTHER PUBLICATIONS

Huizhao Wang, et al., Multi-Link Upper-MAC Entity Instance & New Frame MAC Header, doc.: IEEE 802.11-19 1962r0, Nov. 7, 2019.

* cited by examiner

FIG. 8

| Order | Information |
|---|---|
| 1 | Timestamp |
| 2 | Beacon Interval |
| 3 | Capability Information |
| 4 | Service Set Identifier (SSID) |
| 5 | Supported Rates and BSS Membership Selectors |
| 6 | DSSS Parameter Set |
| 7 | CF Parameter Set |
| 8 | IBSS Parameter Set |
| 9 | Traffic indication map (TIM) |

| Order | Information |
|---|---|
| 10 | Country |
| 11 | Power Constraint |
| 12 | Channel Switch Announcement |
| 13 | Quiet |
| 14 | IBSS DFS |
| 15 | TPC Report |
| 16 | ERP |
| 17 | Extended Supported Rates and BSS Membership Selectors |
| 18 | RSN |
| 19 | BSS Load |
| 20 | EDCA Parameter Set |
| 21 | QoS Capability |
| 22 | AP Channel Report |
| 23 | BSS Average Access Delay |
| 24 | Antenna |

| Order | Information |
|---|---|
| 25 | BSS Available Admission Capacity |
| 26 | BSS AC Access Delay |
| 27 | Measurement Pilot Transmission |
| 28 | Multiple BSSID |
| 29 | RM Enabled Capabilities |
| 30 | Mobility Domain |
| 31 | DSE registered location |
| 32 | Extended Channel Switch Announcement |
| 33 | Supported Operating Classes |
| 34 | HT Capabilities |
| 35 | HT Operation |
| 36 | 20/40 BSS Coexistence |
| 37 | Overlapping BSS Scan Parameters |
| 38 | Extended Capabilities |
| 39 | FMS Descriptor |
| 40 | QoS Traffic Capability |

| Order | Information |
|---|---|
| 41 | Time Advertisement |
| 42 | Interworking |
| 43 | Advertisement Protocol |
| 44 | Roaming Consortium |
| 45 | Emergency Alert Identifier |
| 46 | Mesh ID |
| 47 | Mesh Configuration |
| 48 | Mesh Awake Window |
| 49 | Beacon Timing |
| 50 | MCCAOP Advertisement Overview |
| 51 | MCCAOP Advertisement |
| 52 | Mesh Channel Switch Parameters |
| 53 | QMF Policy |
| 54 | QLoad Report |
| 55 | HCCA TXOP Update Count |
| 56 | Multi-band |
| 57 | VHT Capabilities |
| 58 | VHT Operation |

| Order | Information |
|---|---|
| 59 | Transmit Power Envelope element |
| 60 | Channel Switch Wrapper element |
| 61 | Extended BSS Load element |
| 62 | Quiet Channel |
| 63 | Operating Mode Notification |
| 64 | Reduced Neighbor Report |
| 65 | TVHT Operation |
| 66 | Estimated Service Parameters |
| 67 | Future Channel Guidance |

| Order | Information |
|---|---|
| 76 | Multiple BSSID Configuration |
| 77 | HE Capabilities |
| 78 | HE Operation |
| 79 | TWT |
| 80 | UORA Parameter Set |
| 81 | BSS Color Change Announcement |
| 82 | Spatial Reuse Parameter Set |
| 83 | MU EDCA Parameter Set |
| 84 | ESS Report |
| 85 | NDP Feedback Report Parameter Set |
| 86 | HE BSS Load |
| 87 | HE 6 GHz Band Capabilities |

| Order | Information |
|---|---|
| X | EHT Capabilities |
| Y | EHT Operation |

| Order | Information |
|---|---|
| Z | SWITCH DESTINATION LINK INFORMATION |

| Order | Information |
|---|---|
| Last | Vendor Specific |

FIG.9

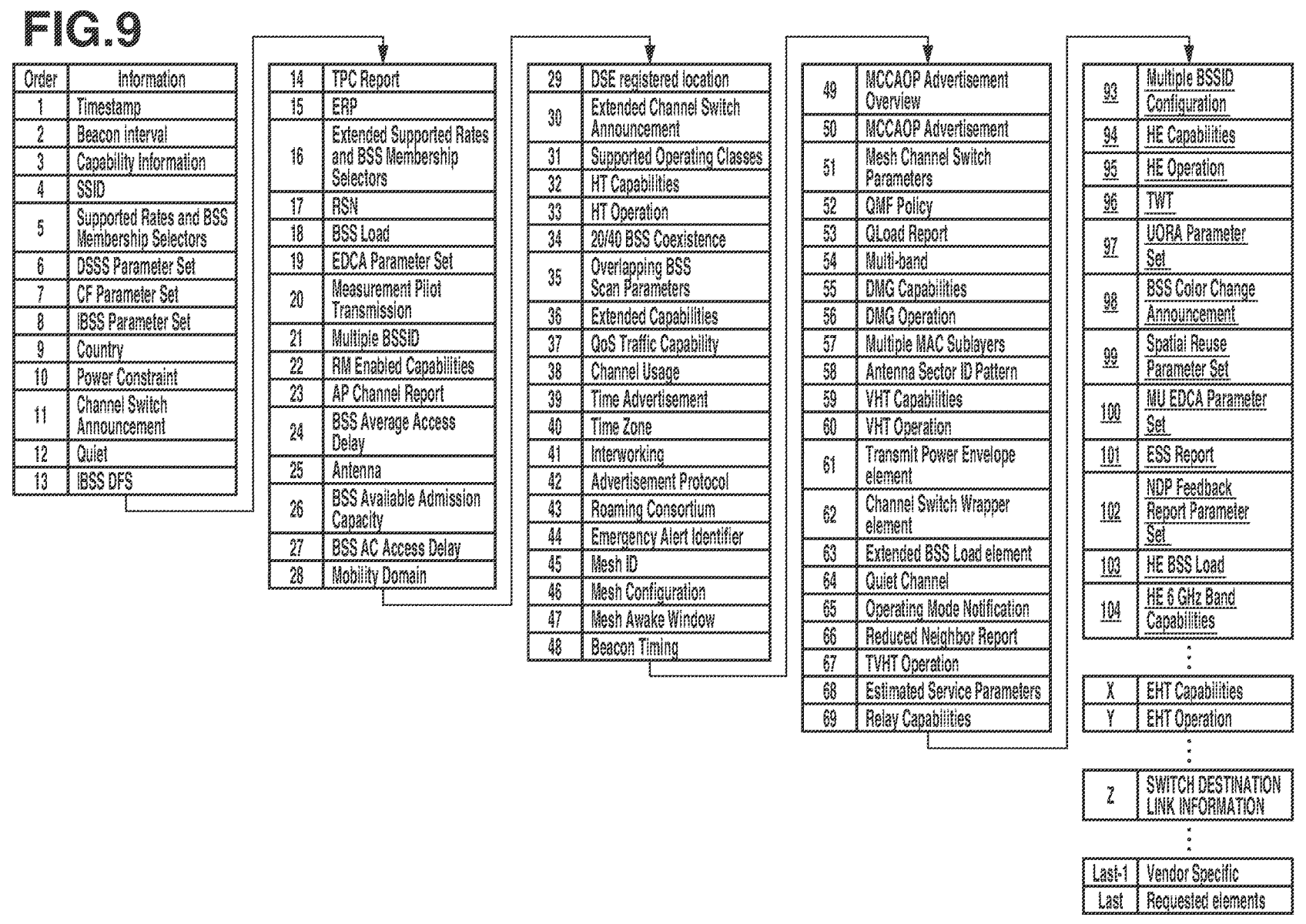

| Order | Information |
|---|---|
| 1 | Timestamp |
| 2 | Beacon Interval |
| 3 | Capability Information |
| 4 | SSID |
| 5 | Supported Rates and BSS Membership Selectors |
| 6 | DSSS Parameter Set |
| 7 | CF Parameter Set |
| 8 | IBSS Parameter Set |
| 9 | Country |
| 10 | Power Constraint |
| 11 | Channel Switch Announcement |
| 12 | Quiet |
| 13 | IBSS DFS |

| | |
|---|---|
| 14 | TPC Report |
| 15 | ERP |
| 16 | Extended Supported Rates and BSS Membership Selectors |
| 17 | RSN |
| 18 | BSS Load |
| 19 | EDCA Parameter Set |
| 20 | Measurement Pilot Transmission |
| 21 | Multiple BSSID |
| 22 | RIM Enabled Capabilities |
| 23 | AP Channel Report |
| 24 | BSS Average Access Delay |
| 25 | Antenna |
| 26 | BSS Available Admission Capacity |
| 27 | BSS AC Access Delay |
| 28 | Mobility Domain |

| | |
|---|---|
| 29 | DSE registered location |
| 30 | Extended Channel Switch Announcement |
| 31 | Supported Operating Classes |
| 32 | HT Capabilities |
| 33 | HT Operation |
| 34 | 20/40 BSS Coexistence |
| 35 | Overlapping BSS Scan Parameters |
| 36 | Extended Capabilities |
| 37 | QoS Traffic Capability |
| 38 | Channel Usage |
| 39 | Time Advertisement |
| 40 | Time Zone |
| 41 | Interworking |
| 42 | Advertisement Protocol |
| 43 | Roaming Consortium |
| 44 | Emergency Alert Identifier |
| 45 | Mesh ID |
| 46 | Mesh Configuration |
| 47 | Mesh Awake Window |
| 48 | Beacon Timing |

| | |
|---|---|
| 49 | MCCAOP Advertisement Overview |
| 50 | MCCAOP Advertisement |
| 51 | Mesh Channel Switch Parameters |
| 52 | QMF Policy |
| 53 | QLoad Report |
| 54 | Multi-band |
| 55 | DMG Capabilities |
| 56 | DMG Operation |
| 57 | Multiple MAC Sublayers |
| 58 | Antenna Sector ID Pattern |
| 59 | VHT Capabilities |
| 60 | VHT Operation |
| 61 | Transmit Power Envelope element |
| 62 | Channel Switch Wrapper element |
| 63 | Extended BSS Load element |
| 64 | Quiet Channel |
| 65 | Operating Mode Notification |
| 66 | Reduced Neighbor Report |
| 67 | TVHT Operation |
| 68 | Estimated Service Parameters |
| 69 | Relay Capabilities |

| | |
|---|---|
| 93 | Multiple BSSID Configuration |
| 94 | HE Capabilities |
| 95 | HE Operation |
| 96 | TWT |
| 97 | UORA Parameter Set |
| 98 | BSS Color Change Announcement |
| 99 | Spatial Reuse Parameter Set |
| 100 | MU EDCA Parameter Set |
| 101 | ESS Report |
| 102 | NDP Feedback Report Parameter Set |
| 103 | HE BSS Load |
| 104 | HE 6 GHz Band Capabilities |

. . .

| | |
|---|---|
| X | EHT Capabilities |
| Y | EHT Operation |

. . .

| | |
|---|---|
| Z | SWITCH DESTINATION LINK INFORMATION |

| | |
|---|---|
| Last-1 | Vendor Specific |
| Last | Requested elements |

FIG.10

COMMUNICATION APPARATUS, COMMUNICATION METHOD, AND STORAGE MEDIUM

CROSS-REFERENCE TO RELATED APPLICATIONS

This application is a Continuation of International Patent Application No. PCT/JP2021/004554, filed Feb. 8, 2021, which claims the benefit of Japanese Patent Application No. 2020-038139, filed Mar. 5, 2020, both of which are hereby incorporated by reference herein in their entireties.

BACKGROUND OF THE INVENTION

Field of the Invention

The present invention relates to transmission and reception of information regarding communication in wireless communication.

Background Art

As wireless local area network (WLAN) communication standards formulated by the Institute of Electrical and Electronics Engineers (IEEE), IEEE802.11 series standards have been known. The IEEE802.11 series standards include standards such as IEEE802.11a/b/g/n/ac/ax standards.

In the IEEE, to further increase throughput and enhance frequency usage efficiency, the formulation of an IEEE 802.11be standard has been considered as a new IEEE 802.11 series standard. In the IEEE 802.11be standard, there has been considered multi-link communication by which one access point (AP) establishes a plurality of links with one station (STA) via a plurality of different frequency channels, and communicates with the STA.

Patent Literature 1 discusses establishing links in a case where an AP and a STA perform communication.

In the multi-link communication, for example, it is considered to perform communication preferentially using a relatively-uncrowded link among a plurality of links. To perform such control, an AP and a STA are required to communicate information regarding another link. Nevertheless, because the multi-link communication is a technique newly introduced in the IEEE 802.11 series standards, in the case of communicating information regarding another link using a media access control (MAC) frame, for example, compatibility thereof needs to be considered.

CITATION LIST

Patent Literature

PTL 1: Japanese Unexamined Patent Application Publication No. 2012-523202

SUMMARY OF THE INVENTION

In view of the foregoing, the present invention is directed to ensuring compatibility of a frame in the case of communicating information regarding a link to be established with another communication apparatus in a frequency channel complying with an IEEE 802.11 series standard.

For achieving the above-described objects, according to an aspect of the present invention, a communication apparatus that can execute multi-link communication complying with an Institute of Electrical and Electronics Engineers (IEEE) 802.11 series standard includes an establishment unit configured to establish a link with another communication apparatus via a frequency channel, and a communication unit configured to communicate a media access control (MAC) frame in which information regarding a second link with the other communication apparatus that is different from a first link established by the establishment unit is included later than a field in which information regarding a service set identifier (SSID) is stored.

Further features of the present invention will become apparent from the following description of exemplary embodiments with reference to the attached drawings.

BRIEF DESCRIPTION OF THE DRAWINGS

FIG. 8 is a diagram illustrating information included in a Beacon.

FIG. 9 is a diagram illustrating information included in a Probe Response.

FIG. 10 is a diagram illustrating an example of a frame format of a switch destination link information element (information element).

DESCRIPTION OF THE EMBODIMENTS

Figure 1:
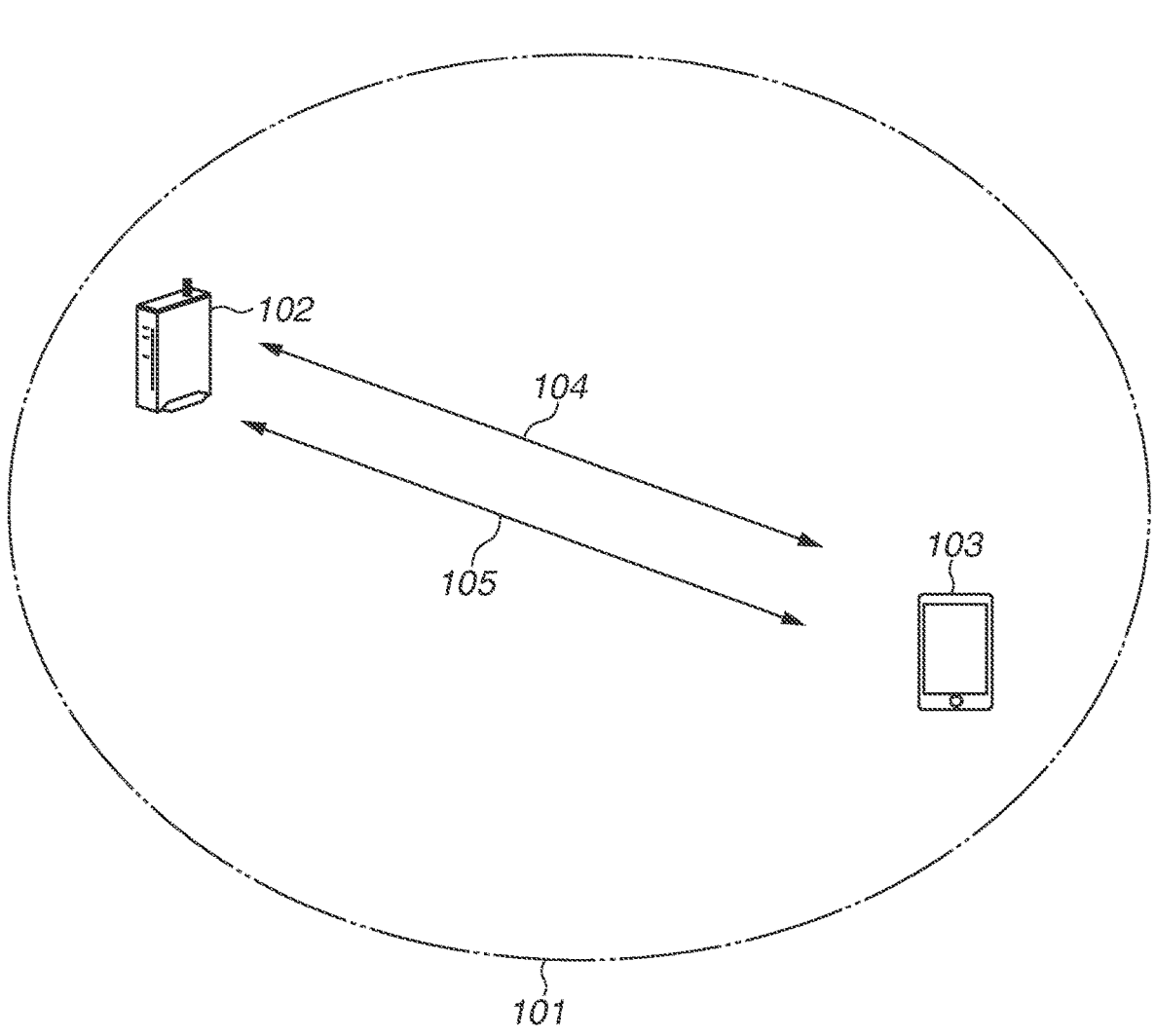
FIG. 1 is a diagram illustrating a configuration of a network to which a communication apparatus 102 belongs.

Hereinafter, an exemplary embodiment of the present invention will be described in detail with reference to the attached drawings. In addition, the configurations to be described in the following exemplary embodiment are mere examples, and the present invention is not limited to the configurations illustrated in the drawings.

FIG. 1 illustrates a configuration of a network in which a communication apparatus 102 according to the present exemplary embodiment participates. The communication apparatus 102 is an access point (AP) having a role of constructing a network 101. The network 101 is a wireless network. In the present exemplary embodiment, in a case where the communication apparatus 102 constructs a plurality of networks, basic service set identifiers (BSSIDs) of the respective networks are all different. The BSSID is an identifier for identifying a network. In addition, the communication apparatus 102 indicates a common service set identifier (SSID) shared among all the networks. Alternatively, the communication apparatus 102 may use SSIDs different for the respective networks. The SSID is an identifier for identifying an AP.

The communication apparatus 103 is a station (STA) having a role of participating in the network 101. Each communication apparatus complies with the Institute of Electrical and Electronics Engineers (IEEE) 802.11be (extremely high throughput (EHT)) standard, and can execute wireless communication complying with the IEEE 802.11be standard, via the network 101. The EHT may be interpreted as an abbreviation for extreme high throughput. Each communication apparatus can execute communication in frequency bands including a 2.4-gigahertz (GHz) band, a 5-GHz band, and a 6-GHz band. Frequency bands to be used by each communication apparatus are not limited to these, and a different frequency band such as a 60-GHz band, for example, may be used. In addition, each communication apparatus can execute communication using bandwidths including a 20-megahertz (MHz) bandwidth, a 40-MHz bandwidth, a 80-MHz bandwidth, a 160-MHz bandwidth, and a 320-MHz bandwidth.

By executing orthogonal frequency division multiple access (OFDMA) communication complying with the IEEE 802.11be standard, the communication apparatuses 102 and 103 can implement multi-user (MU) communication in which signals of a plurality of users are multiplexed. In the OFDMA communication, a part (resource unit (RU)) of divided frequency bands is allocated to each STA while avoiding redundancy, and carriers allocated to the respective STAs are orthogonal to each other. The AP can therefore concurrently communicate with a plurality of STAs.

In addition, the communication apparatuses 102 and 103 execute multi-link communication of performing communication by establishing links via a plurality of frequency channels. The frequency channel is a frequency channel defined in an IEEE 802.11 series standard, and refers to a frequency channel via which wireless communication complying with the IEEE 802.11 series standard can be executed. In the IEEE 802.11 series standards, a plurality of frequency channels is defined for each frequency band of the 2.4-GHz band, the 5-GHz band, and the 6-GHz band. In the IEEE 802.11 series standards, a bandwidth of each frequency channel is defined as 20 MHz. A bandwidth of 40 MHz or more may be used in one frequency channel by making bonding with an adjacent frequency channel. For example, the communication apparatus 102 can establish a first link 104 with the communication apparatus 103 via a first frequency channel in the 2.4-GHz band and a second link 105 via a second frequency channel in the 5-GHz band with the communication apparatus 103, and communicate with the communication apparatus 103 via both of the links. In this case, the communication apparatus 102 maintains the second link 105 via the second frequency channel concurrently with the first link 104 via the first frequency channel. In this manner, the communication apparatus 102 can increase throughput in communication with the communication apparatus 103 by establishing links with the communication apparatus 103 via a plurality of frequency channels. The communication apparatuses 102 and 103 may establish a plurality of links via different frequency bands in multi-link communication. For example, the communication apparatuses 102 and 103 may establish a third link in the 6-GHz band in addition to the first link 104 in the 2.4-GHz band and the second link 105 in the 5-GHz band. Alternatively, the communication apparatuses 102 and 103 may establish links via a plurality of different channels included in the same frequency band. For example, the communication apparatuses 102 and 103 may establish the first link 104 via a 1 channel (ch) in the 2.4-GHz band and the second link 105 via a 5 ch in the 2.4-GHz band. In addition, links in the same frequency band and links in different frequency bands may mixedly exist. For example, the communication apparatuses 102 and 103 may establish a third link via a 36 ch in the 5-GHz band in addition to the first link 104 via the 1 ch in the 2.4-GHz band and the second link 105 via the 5 ch in the 2.4-GHz band. By establishing a plurality of connections with the communication apparatus 103 in different frequency bands, even in a case where a certain frequency band is crowded, the communication apparatus 102 can communicate with the communication apparatus 103 in another frequency band. It is therefore possible to prevent a decline in throughput in communication with the communication apparatus 103.

In this manner, in the multi-link communication, it is sufficient that at least frequency channels of a plurality of links established by the communication apparatuses 102 and 103 are different. In the multi-link communication, a channel interval between frequency channels of a plurality of links established by the communication apparatuses 102 and 103 is only required to be larger than at least 20 MHz. In the present exemplary embodiment, the communication apparatuses 102 and 103 establish the first link 104 and the second link 105, but may establish three or more links.

The communication apparatuses 102 and 103 can execute communication in three modes as multi-link communication. One of the three modes is an asynchronous mode (Async Mode). In this mode, communications via links in multi-link communication are asynchronously performed. Specifically, communication via a first link and communication via a second link are executed at the respective independent timings. Thus, communications via the first link and the second link can be performed at the timings irrespective of a timing at which communication via the other link is performed. In this case, if a channel interval between frequency channels (channels) used by the respective links is narrow, communication via one link affects communication via the other link. Specifically, if frequency channels of links is close, because communication performed via one link is detected by the other link by carrier sense, while communication is being performed via one link, communication via the other link becomes inexecutable. Thus, in the Async Mode, a channel interval between links becomes wider. Another mode is a synchronous mode (Sync Mode). In this mode, communications via a plurality of links are synchronously executed. Specifically, communication via a first link and communication via a second link are started at the same timing. In this case, because communications via the respective links are started at the same time, communication performed via one link is not detected by the other link by carrier sense. Thus, a channel interval between channels used by the respective links may be narrow. In addition, yet another mode is a semi-asynchronous mode (Semi-Async Mode). In this mode, in the case of performing data communication via certain one link, in a case where a frequency channel of a different link is unoccupied, communications via the both links are synchronously executed. For example, in a case where a backoff counter of a first link becomes 0, in a case where a frequency channel of a second link is unoccupied, communications via the first link and the second link are started at the same timing. In this case, a backoff counter of the second link need not be 0. In a case where a backoff counter of a first link becomes 0, in a case where a frequency channel of a second link is occupied, only communication via the first link is started and communication via the second link is not started. In this mode, in a case where communications via a plurality of links are concurrently performed, because the communications via the respective links are simultaneously started, an interval between channels used by the respective links may be narrow. The communication apparatuses 102 and 103 may select a mode to be used in multi-link communication, based on a channel interval between a plurality of established links.

In the case of performing multi-link communication, at least one of the communication apparatuses 102 and 103 is an apparatus that can simultaneously execute data transmission via a certain link and data reception via a different link. Alternatively, at least one of the communication apparatuses 102 and 103 may be an apparatus that can simultaneously execute only data transmission via a different link in the case of performing data transmission via a certain link. Alternatively, at least one of the communication apparatuses 102 and 103 may be an apparatus that can simultaneously execute only data reception via a different link in the case of performing data reception via a certain link. Alternatively, at least one of the communication apparatuses 102 and 103 may be an apparatus that can simultaneously maintain a plurality of links but cannot simultaneously execute data communication via a different link in the case of performing data communication via a certain link. Such a communication apparatus does not support the Sync Mode or the Semi-Async Mode.

In the case of performing multi-link communication, the communication apparatuses 102 and 103 divide one piece of data and transmit the divided data to a counterpart apparatus via a plurality of links. Alternatively, by transmitting the same data via a plurality of links, the communication apparatuses 102 and 103 may execute communication via one link as backup communication for communication via the other link. Specifically, it is assumed that the communication apparatus 102 transmits the same data to the communication apparatus 103 via a first link via a first frequency channel and a second link via a second frequency channel. In this case, for example, even if an error occurs in communication via the first link, the same data is transmitted via the second link. The communication apparatus 103 can therefore receive data transmitted from the communication apparatus 102. Alternatively, the communication apparatuses 102 and 103 may switch a link to be used, depending on the type of a frame to be communicated, or the type of data to be communicated. For example, the communication apparatus 102 may transmit a management frame via a first link and transmit a data frame including data, via a second link. The management frame specifically refers to a Beacon frame, a Probe Request frame/Response frame, or an Association Request frame/Response frame. In addition to these frames, a Disassociation frame, an Authentication frame, a De-Authentication frame, and an Action frame are also called management frames. The Beacon frame is a frame to report information regarding a network. In addition, the Probe Request frame is a frame to request network information. The Probe Response frame is a response to the Probe Request frame, and is a frame to provide network information. The Association Request frame is a frame to request connection. The Association Response frame is a response to the Association Request frame, and is a frame indicating a connection permission or error. The Disassociation frame is a frame to disconnect connection. The Authentication frame is a frame to authenticate a counterpart apparatus, and the De-Authentication frame is a frame to stop authentication of a counterpart apparatus and disconnect connection. The Action frame is a frame to perform an additional function other than the above-described functions. The communication apparatuses 102 and 103 transmit and receive management frames complying with the IEEE 802.11 series standard. Alternatively, in a case where the communication apparatus 102 transmits data regarding a captured image, for example, the communication apparatus 102 may transmit metainformation such as dates, parameters (aperture value, shutter speed, etc.) set in image capturing, and position information, via a first link, and transmit pixel information via a second link.

The communication apparatuses 102 and 103 may be able to execute multiple-input and multiple-output (MIMO) communication. In this case, the communication apparatuses 102 and 103 include a plurality of antennas, and one transmits different signals from the antennas using the same frequency channel A reception side simultaneously receives all signals that have reached from a plurality of streams using the plurality of antennas, separates the signals from the streams, and decodes the signals. In this manner, by executing the MIMO communication, the communication apparatuses 102 and 103 can communicate a larger amount of data during the same time as compared with a case where the MIMO communication is not executed. In addition, the communication apparatuses 102 and 103 may execute MIMO communication via a part of links in the case of performing multi-link communication.

In the present exemplary embodiment, in a case where the communication apparatus 102 executes multi-link communication with the communication apparatus 103, the communication apparatus 102 can transmit information regarding the second link 105, to the communication apparatus 103 via the first link 104. The information regarding the second link 105 is information indicating a frequency channel used by the second link 105, and information indicating whether the frequency channel is busy (occupied), for example. The communication apparatus 103 that has received the information regarding the second link 105 can determine whether to switch a link to be used for data communication with the communication apparatus 102, from the first link 104 to the second link 105, using the received information. In this manner, by receiving information regarding a different link established with the communication apparatus 102, the communication apparatus 103 can switch a link to be used for data communication, to a more appropriate link. In the present exemplary embodiment, such information regarding the second link 105 will be referred to as switch destination information of multi-link communication. The details of the switch destination information will be described with reference to FIG. 10 to be described below.

The communication apparatus 102 may transmit information regarding a link that can be established with the communication apparatus 103 by itself, in place of or in addition to information regarding a link already established with the communication apparatus 103. The information regarding a link that can be established with the communication apparatus 103 is information indicating a frequency channel via which the communication apparatus 102 has already established a wireless network and has not established a link with the communication apparatus 103 yet, for example. In place of or in addition to this, the information may be information indicating whether the frequency channel is busy. In the present exemplary embodiment, these pieces of information may be referred to as switch destination information of multi-link communication in addition to or in place of information regarding the second link 105. The details of these pieces of information will be described with reference to FIG. 10 to be described below. By receiving such information, the communication apparatus 103 can newly establish a link with the communication apparatus 102, and switch a link to be used for data communication, from a currently-used link to the newly-established link. In this manner, by newly establishing a link serving as a switch destination, at the time of link switch, power saving of the communication apparatuses 102 and 103 can be improved.

The communication apparatuses 102 and 103 comply with the IEEE 802.11be standard, but the communication apparatuses 102 and 103 may additionally comply with at least any one of legacy standards, which are standards formulated earlier than the IEEE 802.11be standard. The legacy standards refer to the IEEE 802.11a/b/g/n/ac/ax standards. In the present exemplary embodiment, at least any one of the IEEE 802.11a/b/g/n/ac/ax/be standards will be referred to as an IEEE 802.11 series standard. In addition to the IEEE802.11 series standards, the communication apparatuses 102 and 103 may comply with other communication standards such as Bluetooth (registered trademark), near field communication (NFC), an ultra wide band (UWB), ZigBee, and a multi band OFDM alliance (MBOA). The UWB includes a wireless universal serial bus (USB), wireless 1394, Winners Information Network (WiNET), and the like. In addition, the communication apparatuses 102 and 103 may comply with a communication standard of wired communication of a wired local area network (LAN) or the like.

Specific examples of the communication apparatus 102 include a wireless LAN router, a personal computer (PC), and the like, but the communication apparatus 102 is not limited to these. The communication apparatus 102 may be any communication apparatus as long as the communication apparatus can execute multi-link communication with another communication apparatus. In addition, the communication apparatus 102 may be an information processing apparatus such as a wireless chip that can execute wireless communication complying with the IEEE 802.11be standard. In addition, specific examples of the communication apparatus 103 include a camera, a tablet, a smartphone, a PC, a mobile phone, a video camera, and the like, but the communication apparatus 103 is not limited to these. The communication apparatuses 103 is only required to be a communication apparatus that can execute multi-link communication with another communication apparatus. In addition, the communication apparatus 103 may be an information processing apparatus such as a wireless chip that can execute wireless communication complying with the IEEE 802.11be standard. In addition, the network illustrated in FIG. 1 is a network including one AP and one STA, but the number of APs and the number of STAs are not limited to these. In addition, an information processing apparatus such as a wireless chip includes an antenna for transmitting a generated signal.

In the present exemplary embodiment, the communication apparatus 102 serves as an AP and the communication apparatus 103 serves as a STA, but a configuration is not limited to this. Both of the communication apparatuses 102 and 103 may serve as STAs. In this case, the communication apparatus 102 is a STA but operates as an apparatus having a role of constructing a wireless network for establishing a link with the communication apparatus 103.

Figure 2:
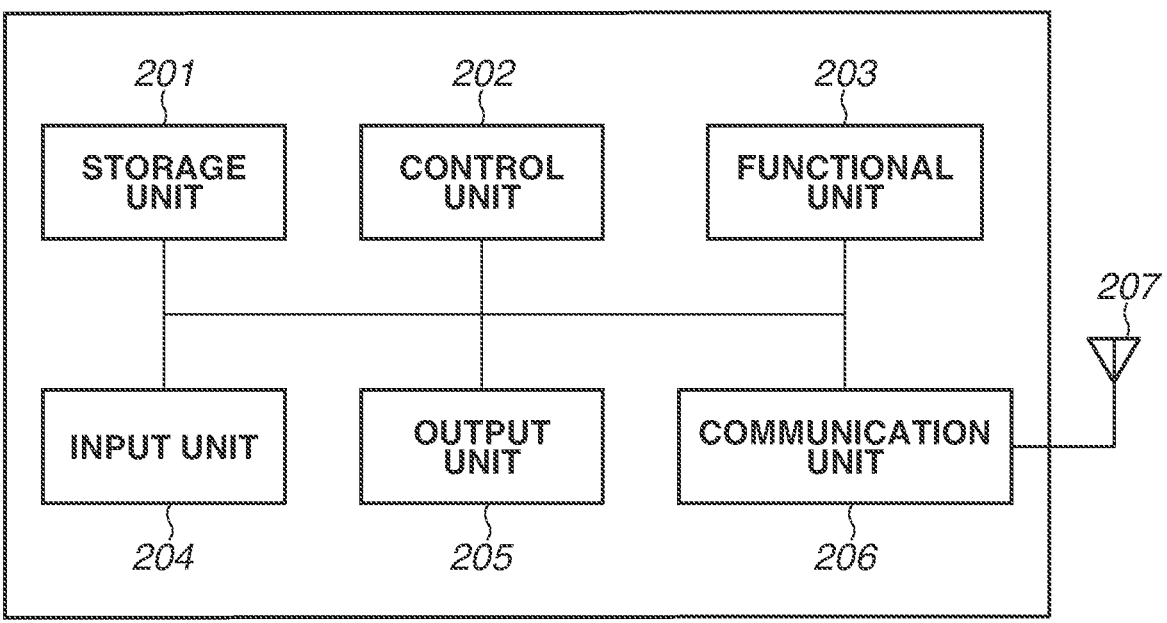
FIG. 2 is a diagram illustrating a hardware configuration of the communication apparatus 102.

FIG. 2 illustrates a hardware configuration of the communication apparatus 102 according to the present exemplary embodiment. The communication apparatus 102 includes a storage unit 201, a control unit 202, a functional unit 203, an input unit 204, an output unit 205, a communication unit 206, and an antenna 207.

The storage unit 201 includes one or more memories such as a read only memory (ROM) and a random access memory (RAM), and stores computer programs for performing various operations to be described below, and various types of information such as communication parameters for wireless communication. Aside from memories such as a ROM and a RAM, a storage medium such as a flexible disk, a hard disk, an optical disk, a magnet-optical disk, a compact disk read only memory (CD-ROM), a CD recordable (CD-R), a magnetic tape, a nonvolatile memory card, or a digital versatile disk (DVD) may be used as the storage unit 201. In addition, the storage unit 201 may include a plurality of memories and the like.

For example, the control unit 202 includes one or more processors such as a central processing unit (CPU) and a micro processing unit (MPU), for example. By executing computer programs stored in the storage unit 201, the control unit 202 controls the entire communication apparatus 102. The control unit 202 may control the entire communication apparatus 102 in cooperation with computer programs stored in the storage unit 201, and an operating system (OS). In addition, the control unit 202 generates data and signals (radio frames) to be transmitted in the communication with another communication apparatus. In addition, the control unit 202 may include a plurality of processors such as multi-core processors, and control the entire communication apparatus 102 using the plurality of processors.

In addition, the control unit 202 executes predetermined processing such as wireless communication, image capturing, printing, and projection by controlling the functional unit 203. The functional unit 203 is hardware for the communication apparatus 102 executing the predetermined processing.

The input unit 204 receives various operations from the user. The output unit 205 performs various outputs to the user via a monitor screen and a speaker. The output performed by the output unit 205 may be display on the monitor screen, voice output by the speaker, vibration output, or the like. Both the input unit 204 and the output unit 205 may be implemented by one module like a touch panel. In addition, the input unit 204 and the output unit 205 may be each formed integrally with the communication apparatus 102, or may be each formed separately from the communication apparatus 102.

The communication unit 206 controls wireless communication complying with the IEEE 802.11be standard. In addition, the communication unit 206 may control wireless communication complying with other IEEE 802.11 series standards in addition to the IEEE 802.11be standard, and may control wired communication via a wired LAN or the like. The communication unit 206 controls the antenna 207, and transmits and receives signals for wireless communication that have been generated by the control unit 202. In a case where the communication apparatus 102 complies with an NFC standard, a Bluetooth standard, and the like in addition to the IEEE 802.11be standard, the communication unit 206 may control wireless communication complying with these communication standards. In addition, in a case where the communication apparatus 102 can execute wireless communication complying with a plurality of communication standards, communication units and antennas that correspond to the respective communication standards may be individually included. Via the communication unit 206, the communication apparatus 102 communicates data such as image data, document data, and video data with the communication apparatus 103. In addition, the antenna 207 may be formed separately from the communication unit 206, or may be formed as one module together with the communication unit 206.

The antenna 207 is an antenna that can execute communication in the 2.4-GHz band, the 5-GHz band, and the 6-GHz band. In the present exemplary embodiment, the communication apparatus 102 includes one antenna, but may include different antennas for the respective frequency bands. In a case where the communication apparatus 102 includes a plurality of antenna, the communication apparatus 102 may include communication units 206 corresponding to the respective antennas.

The communication apparatus 103 has a hardware configuration similar to that of the communication apparatus 102.

Figure 3:
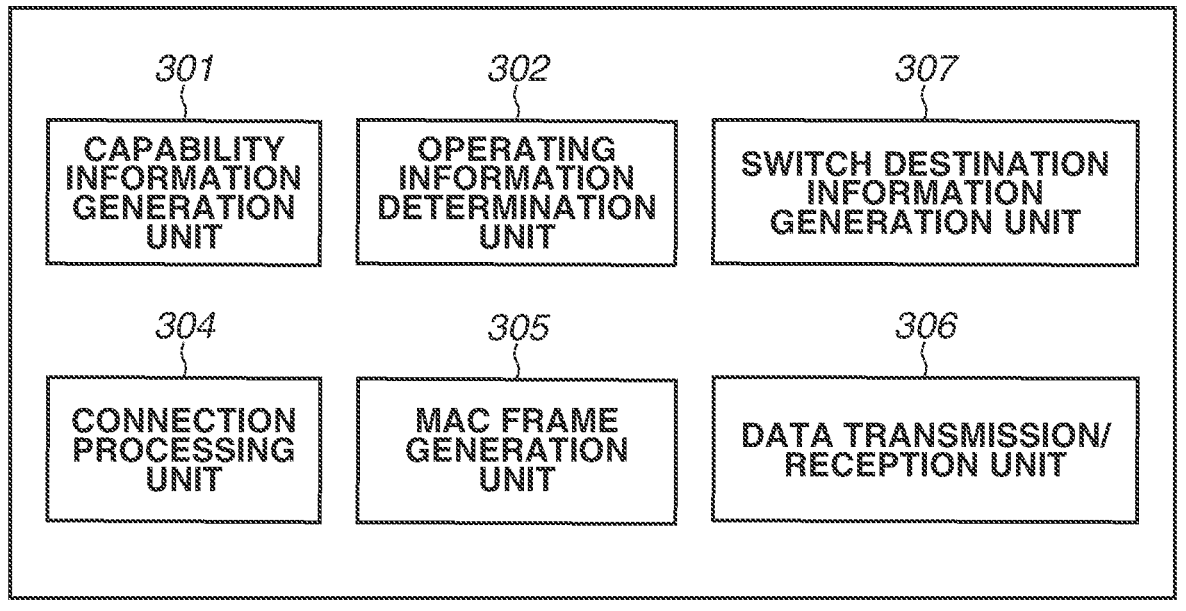
FIG. 3 is a diagram illustrating a functional configuration of the communication apparatus 102.

FIG. 3 illustrates a functional configuration of the communication apparatus 102 according to the present exemplary embodiment. The communication apparatus 102 includes a capability information generation unit 301 for multi-link communication, an operating information determination unit 302 for multi-link communication, and a switch destination information generation unit 307 for multi-link communication. In addition to these, the communication apparatus 102 also includes a connection processing unit 304, a media access control (MAC) frame generation unit 305, and a data transmission/reception unit 306.

The capability information generation unit 301 is a block that generates capability information regarding multi-link communication of the communication apparatus 102. The communication apparatus 102 generates capability information for notifying a different communication apparatus of capability regarding multi-link communication of itself. The capability information regarding multi-link communication will be described with reference to FIG. 5 to be described below. As for capability information, a communication apparatus may notify a different communication apparatus of capability information of itself, or may only receive a capability information of a counterpart apparatus from a different communication apparatus.

The operating information determination unit 302 is a block that determines operating information regarding multi-link communication with a counterpart apparatus, based on capability information regarding multi-link communication of itself and the counterpart apparatus. The operating information regarding multi-link communication refers to a frequency channel and a bandwidth to be used in communication executed as multi-link communication between the communication apparatuses 102 and 103. The details of the operating information regarding multi-link communication will be described with reference to FIG. 5 to be described below. As for operating information, a counterpart apparatus may be notified of determined operating information, or a counterpart apparatus need not be notified of the determined operating information.

The connection processing unit 304 is a block that performs processing for causing the communication apparatus 103 serving as a STA, to participate in the network 101 constructed by the communication apparatus 102. Specifically, the connection processing unit 304 causes the communication apparatus 102 to transmit an Association Response frame as a response to an Association Request being a connection request received from the communication apparatus 103. The communication apparatus 102 includes the connection processing units 304 corresponding to a plurality of respective links to be established by itself.

The MAC frame generation unit 305 is a block that generates a MAC frame including information indicating capability information regarding multi-link communication that has been generated by the capability information generation unit 301, and operating information regarding multi-link communication that has been determined by the operating information determination unit 302. The MAC frame generation unit 305 also generates a MAC frame including information indicating switch destination information regarding multi-link communication that has been generated by the switch destination information generation unit 307 to be described below. A MAC frame generated by the MAC frame generation unit 305 is transmitted with being included in at least any radio frame of a Beacon, a Probe Response, and an Association Response. In addition to or in place of this, the generated MAC frame is transmitted with being included in a Reassociation Response. The capability information and the operating information included in a MAC frame generated by the MAC frame generation unit 305 are indicated by an element illustrated in FIG. 5 to be described below. In addition, switch destination information included in a MAC frame generated by the MAC frame generation unit 305 is indicated by an element illustrated in FIG. 10 to be described below.

The data transmission/reception unit 306 is a block that transmits and receives a data frame in multi-link communication based on operating information regarding multi-link communication that has been determined by the operating information determination unit 302. The data transmission/reception unit 306 may transmit a radio frame including a MAC frame generated by the MAC frame generation unit 305, and receive a radio frame from a counterpart apparatus.

The switch destination information generation unit 307 is a block that generates information regarding a different link in multi-link communication that is to be transmitted by the communication apparatus 102 to the communication apparatus 103. The communication apparatus 102 generates information regarding a link that has been established by itself with the communication apparatus 103, and is different from a link to be used for transmission of the information. The information regarding a different link will be described with reference to FIG. 10 to be described below. As the information regarding a different link, information regarding a link that can be established with the communication apparatus 103 from now may be generated. The information regarding a link that can be established with the communication apparatus 103 from now is information regarding a link that has not been used yet for establishment of a link with the communication apparatus 103, but can be established via a wireless network constructed by the communication apparatus 102. In addition to information regarding a different link, information regarding a link to be used for transmission of the information may be generated as information to be transmitted to the communication apparatus 103.

The communication apparatus 103 has a functional configuration similar to that of the communication apparatus 102, but differs in the following point.

The communication apparatus 103 includes a request information determination unit 302 in place of the operating information determination unit 302. The request information determination unit 302 is a block that determines request information regarding multi-link communication with a counterpart apparatus, based on capability information regarding multi-link communication of the communication apparatus 103 and the counterpart apparatus. The request information regarding multi-link communication refers to a frequency channel and a bandwidth that are requested to be used in communication to be executed as multi-link communication between the communication apparatuses 102 and 103. The details of the request information regarding multi-link communication will be described with reference to FIG. 5 to be described below. The communication apparatus 103 may notify a counterpart apparatus of the determined request information, or need not notify a counterpart apparatus of the determined request information.

The connection processing unit 304 is a block that performs processing for the communication apparatus 103 participating in the network 101 constructed by the communication apparatus 102 serving as an AP. Specifically, the connection processing unit 304 causes the communication apparatus 103 to transmit an Association Request being a connection request, to the communication apparatus 102, and receive an Association Response from the communication apparatus 102 as a response.

The MAC frame generation unit 305 is a block that generates a MAC frame including information indicating capability information regarding multi-link communication that has been generated by the capability information generation unit 301, and request information regarding multi-link communication that has been determined by the request information determination unit 302. A MAC frame generated by the MAC frame generation unit 305 is transmitted with being included in at least any radio frame of a Probe Request, an Association Request, and a Reassociation Request. The capability information and the request information included in a MAC frame generated by the MAC frame generation unit 305 are indicated by the element illustrated in FIG. 5 to be described below.

The communication apparatus 103 need not include the switch destination information generation unit 307.

Figure 4:
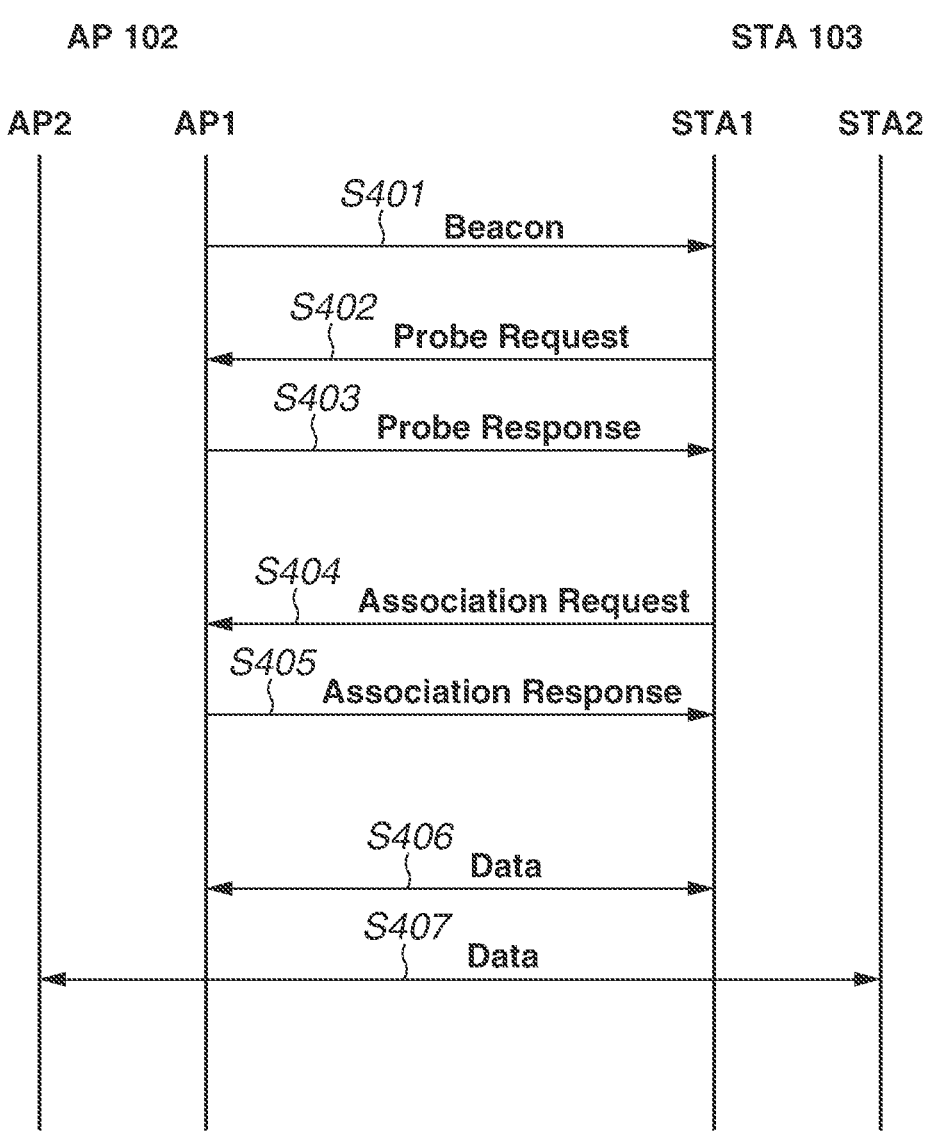
FIG. 4 is a sequence diagram illustrating an example of processing to be executed when communication apparatuses 102 and 103 establish a link of multi-link communication.

FIG. 4 is a sequence diagram illustrating an example of processing to be executed when the communication apparatuses 102 and 103 establish a link of multi-link communication.

The communication apparatuses 102 and 103 each internally include the connection processing units 304 corresponding to a plurality of respective links. An AP1 of the communication apparatus 102 is the connection processing unit 304 for a first link, and an AP2 is the connection processing unit 304 for a second link. In addition, A STA1 of the communication apparatus 103 is the connection processing unit 304 for the first link, and A STA2 is the connection processing unit 304 for the second link. The STA1 and the AP1 perform processing of communication via a first frequency channel (for example, 1 ch in the 2.4-GHz band). The STA2 and the AP2 perform processing of communication via a second frequency channel (for example, 36 ch in the 5-GHz band).

The processing in this sequence is started in accordance with the powers of the communication apparatuses 102 and 103 being turned on. Alternatively, at least one of the communication apparatuses 102 and 103 may start the processing in accordance with a start instruction of multi-link communication being issued from a user or an application. Alternatively, at least one of the communication apparatuses 102 and 103 may start the processing in accordance with a data amount of data desired to be communicated with a counterpart apparatus, becoming large than or equal to a predetermined threshold value.

If the communication apparatus 103 receives a Beacon of the communication apparatus 102 that has been transmitted via the first frequency channel, in step S402, the communication apparatus 103 transmits a Probe Request via the first frequency channel for inquiring about network information of the communication apparatus 102. The Probe Request includes an SSID of the communication apparatus 103. By including a Multi-Link Capability Element illustrated in FIG. 5 to be described below, into the Probe Request in addition to the SSID, the communication apparatus 103 may notify the communication apparatus 102 of capability information regarding multi-link communication of the communication apparatus 103.

If the communication apparatus 102 receives the Probe Request, in step S403, the communication apparatus 102 transmits a Probe Response to the communication apparatus 103 as a response via the first frequency channel. In a case where the communication apparatus 102 has not included the Multi-Link Capability Element illustrated in FIG. 5, into the Beacon, the communication apparatus 102 transmits the element with being included in the Probe Response. Alternatively, the communication apparatus 102 may include only a part of information included in the Multi-Link Capability Element illustrated in FIG. 5 to be described below, into the Beacon, and include remaining information or all pieces of information into the Probe Response.

By performing the processing in steps S401 to S403, the communication apparatuses 102 and 103 can exchange their capability information regarding multi-link communication. In addition, by including a switch destination information element illustrated in FIG. 10 to be described below, into the Beacon to be transmitted in step S401, the communication apparatus 102 can indicate switch destination information in multi-link communication. In addition to or in place of the Beacon, the communication apparatus 102 may include the switch destination information element into the Probe Response to be transmitted in step S403. After establishing at least one link of multi-link communication with the communication apparatus 103, the communication apparatus 102 includes the switch destination information element into at least one of the Beacon and the Probe Response. In this case, in a case where the communication apparatus 102 has not established any link of multi-link communication with the communication apparatus 103, the communication apparatus 102 transmits a Beacon and a Probe Response that do not include switch destination information. Alternatively, even in a case where the communication apparatus 102 has not established any link of multi-link communication with the communication apparatus 103, the communication apparatus 102 may include switch destination information indicating information regarding a link that can be established with the communication apparatus 103.

Next, the communication apparatus 103 transmits an Association Request being a connection request, to the communication apparatus 102 via the first frequency channel. In this case, the communication apparatus 103 may notify the communication apparatus 102 of capability information regarding multi-link communication of the communication apparatus 103, by including the Multi-Link Capability Element illustrated in FIG. 5, into the Association Request. The communication apparatus 103 may determine capability information to be transmitted in step S404, based on capability information regarding multi-link communication of the communication apparatus 102 that has been acquired in at least one of step S401 or S403. For example, even in a case where the communication apparatus 103 can combine links in the 2.4-GHz band and the 5-GHz band in multi-link communication, the communication apparatus 102 is assumed to support only a plurality of links in the 2.4-GHz band. In this case, the communication apparatus 103 may transmit only capability information regarding the establishment of a plurality of links in the 2.4-GHz band, as capability information to be transmitted in this step. In the present exemplary embodiment, the communication apparatus 103 transmits capability information regarding multi-link communication of itself in step S402, but the processing is not limited to this. The communication apparatus 103 may transmit capability information only in this step without transmitting capability information in step S402. Alternatively, by including the Multi-Link Capability Element illustrated in FIG. 5, into the Association Request, the communication apparatus 103 may transmit request information to make a request in performing multi-link communication, instead of capability information. The request information regarding a request from the communication apparatus 103 may be indicated by the Multi-Link Capability Element illustrated in FIG. 5, or may be indicated by another element. The details of the request information will be described with reference to FIG. 5 to be described below.

If the communication apparatus 102 receives the Association Request, in step S405, the communication apparatus 102 transmits an Association Response to the communication apparatus 103 as a response via the first frequency channel. The Association Response transmitted in this step includes a Multi-Link Capability Element indicating operating information in performing multi-link communication with the communication apparatus 103 that has been determined by the communication apparatus 102. The operating information may be indicated by an element different from the Multi-Link Capability Element. In a case where the communication apparatus 103 serving as a STA has transmitted, in step S404, an Association Request including operating information requested by the communication apparatus 103, the communication apparatus 102 may transmit an Association Response only including executability for the request.

In a case where multi-link communication that is based on operating information included in the Association Response can be executed by the communication apparatus 103, in step S406, the communication apparatuses 102 and 103 establish a link via the first frequency channel, and start data communication. In this case, in a case where the operating information transmitted by the communication apparatus 102 includes operating information of a link via the second frequency channel, in step S407, the communication apparatuses 102 and 103 also establish a link via the second frequency channel, and start data communication.

Also in a case where the communication apparatus 102 permits, in step S405, the request information transmitted by the communication apparatus 103 in step S404, the processing in step S406 is similarly performed. In a case where the request information transmitted by the communication apparatus 103 in step S404 also includes request information regarding a link via the second frequency channel, the processing in step S407 is performed.

In the present exemplary embodiment, two links are established by frame transmission and reception via one frequency channel, but the number of links is not limited to this, and three or more links may be established.

In the present exemplary embodiment, a case where multi-link communication is started from a state in which a link has not been established yet between the communication apparatuses 102 and 103 has been described, but a configuration is not limited to this. The communication apparatuses 102 and 103 may start multi-link communication by establishing a new link in addition to an already-established link. In this case, in a case where the communication apparatus 103 serving as a STA has already acquired capability information regarding multi-link communication of the communication apparatus 102 serving as an AP, the sequence may be started from the processing in step S404. Alternatively, in a case where the communication apparatus 102 has already acquired capability information regarding multi-link communication of the communication apparatus 103, the communication apparatus 102 may be enabled to start the sequence from the processing in step S404, by transmitting a signal for causing the communication apparatus 103 to transmit an Association Request. Alternatively, the communication apparatuses 102 and 103 may newly establish a link in addition to a plurality of already-established links. Also in this case, the sequence illustrated in FIG. 4 may be started from the processing in step S404.

The communication apparatus 102 transmits a Beacon every predetermined time. Based on switch destination information included in the Beacon transmitted every predetermined time, the communication apparatus 103 can determine whether to switch a link to be used to perform data communication with the communication apparatus 102, from a currently-used link to a different link. The communication apparatus 102 transmits a Probe Response as a response to a Probe Request transmitted from the communication apparatus 103. The communication apparatus 103 may transmit a Probe Request to the communication apparatus 102 for the purpose of not only an inquiry about network information of the communication apparatus 102 but also acquisition of switch destination information.

Figure 5:
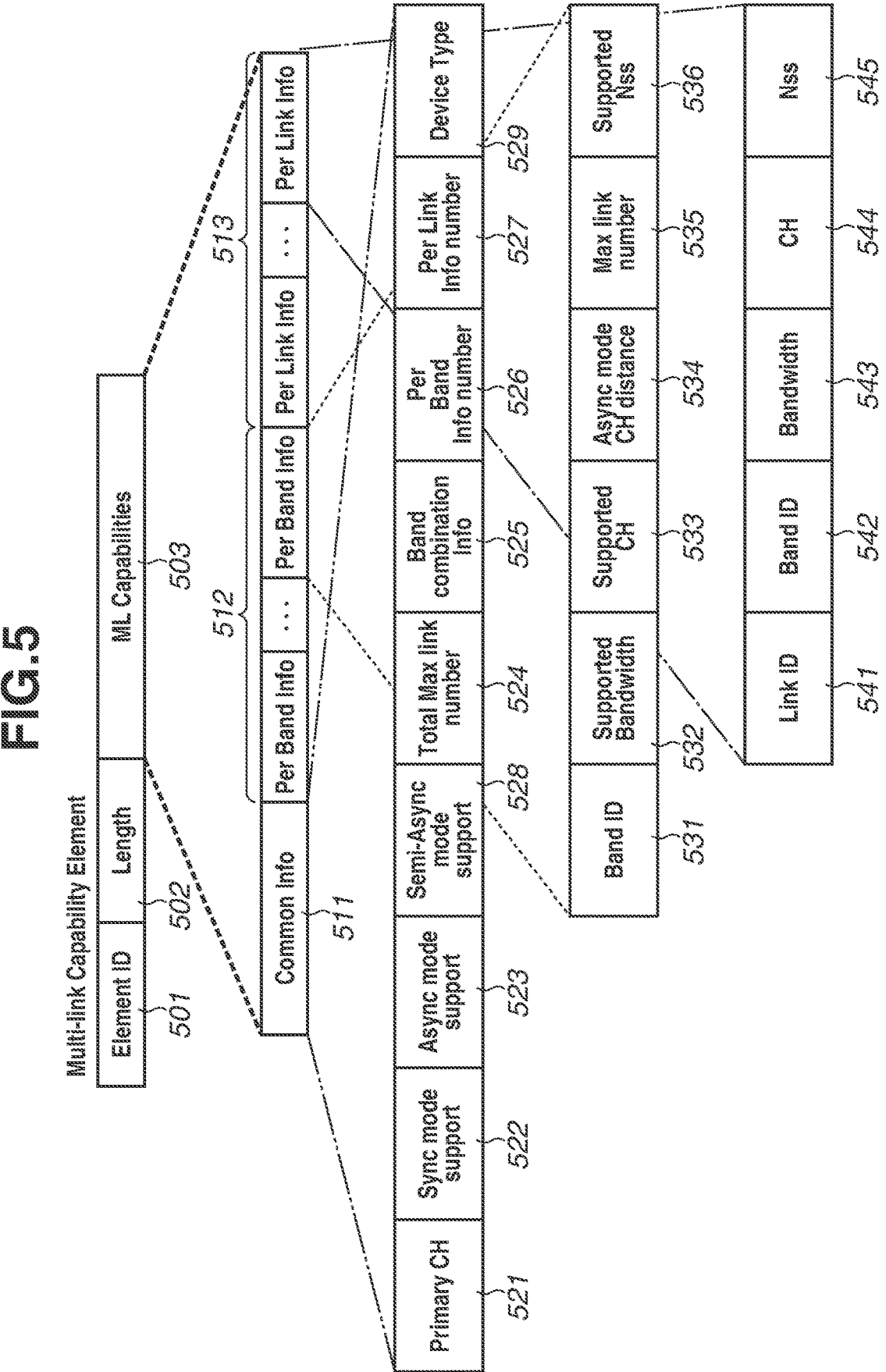
FIG. 5 is a diagram illustrating an example of a frame format of a Multi-Link Capability Element.

FIG. 5 is a diagram illustrating an example of a frame format of a Multi-Link Capability Element. In the present exemplary embodiment, a name of an element illustrated in FIG. 5 is a Multi-Link Capability Element, but the name is not limited to this. For example, the name may be a different name such as a Multi-Link Element.

By using the Multi-Link Capability Element illustrated in FIG. 5, the communication apparatuses 102 and 103 can notify a counterpart apparatus of capability information indicating capability of itself in multi-link communication. By using the Multi-Link Capability Element illustrated in FIG. 5, the communication apparatus 102 can also notify a counterpart apparatus of operating information in performing multi-link communication, in addition to or in place of capability information. By using the Multi-Link Capability Element illustrated in FIG. 5, the communication apparatus 103 can also notify a counterpart apparatus of request information in performing multi-link communication, in addition to or in place of capability information.

The Multi-Link Capability Element illustrated in FIG. 5 includes an Element ID 501, a Length 502, and Multi-Link (ML) Capabilities 503. The Element ID 501 is an identifier to identify an information element. In the present exemplary embodiment, an identifier indicating a Multi-Link Capability Element is included. The Length 502 is a field indicating a data length of an element. In the present exemplary embodiment, information indicating a data length of the ML Capabilities 503 is included. The ML Capabilities 503 indicate information unique to the Multi-Link Capability Element, and include information regarding multi-link communication. The details of information included in the ML Capabilities 503 will be described below.

The communication apparatuses 102 and 103 generate the Multi-Link Capability Element illustrated in FIG. 5, in order from the element ID 501, and transmit the generated Multi-Link Capability Element to another communication apparatus. In this case, the communication apparatuses 102 and 103 transmit the Multi-Link Capability Element after generating all fields in the frame. Specifically, the communication apparatuses 102 and 103 transmit the Multi-Link Capability Element to another communication apparatus after generating all of the element ID 501, the Length 502, and the ML Capabilities 503. Alternatively, the communication apparatuses 102 and 103 may perform transmission concurrently with the generation of fields. Specifically, the communication apparatuses 102 and 103 may perform generation of the Length 502 concurrently with the transmission of the generated Element ID 501, for example.

The communication apparatus 102 serving as an AP adds a MAC frame including a Multi-Link Capability Element, to a radio frame such as a Beacon or a Probe Response, and transmits the radio frame. The communication apparatus 102 can also add a MAC frame including this element, to a radio frame such as an Association Response or a Reassociation Response, in addition to these radio frames. The communication apparatus 103 serving as a STA adds a MAC frame including a Multi-Link Capability Element, to a radio frame such as a Probe Request or an Association Request, and transmits the radio frame. The communication apparatus 103 can also add a MAC frame including this element, to a Reassociation Request, in addition to these radio frames.

The ML Capabilities 503 include Common Info 511, Per Band Info 512, and Per Link Info 513. The Common Info 511 is a field indicating information common to all frequency bands and links. The Per Band Info 512 is a field indicating information common to all links included in a specific frequency band, and is information indicated for each frequency band. The Per Link Info 513 is a field indicating information for each link.

The Common Info 511 includes a Primary CH 521, a Sync Mode Support 522, an Async Mode Support 523, and a Semi-Async Mode Support 528. The Common Info 511 further includes a Total Max Link Number 524, Band Combination Info 525, and a Per Band Info Number 526. The Common Info 511 further includes a Per Link Info Number 527 and a Device Type 529.

The Primary CH 521 is a field including information indicating a frequency channel via which transmission and reception of a management frame regarding multi-link communication are performed. A Primary CH refers to a frequency channel to be used when transmission and reception of a management frame are performed when connection or disconnection of a link is performed in multi-link communication. Specifically, a Primary CH includes information indicating a frequency channel via which transmission and reception of a Beacon including a Multi-Link Capability Element are performed. The communication apparatus 102 serving as an AP includes, into a Primary CH, information indicating a frequency channel to be used when a Beacon including a Multi-Link Capability Element is transmitted. The communication apparatus 103 serving as a STA includes, into a Primary CH, information indicating a frequency channel via which the Beacon including the Multi-Link Capability Element has been received (i.e., a Probe Request including the element is transmitted). In the present exemplary embodiment, information indicating the first frequency channel via which transmission and reception of a Beacon and a Probe Request/Response are performed in the sequence illustrated in FIG. 4 is included. In a case where a frequency channel to be used to perform transmission and reception of a management frame is changed after the communication apparatuses 102 and 103 start multi-link communication, the Primary CH 521 includes information indicating a changed frequency channel. The Primary CH 521 includes information indicating a frequency channel via which transmission and reception of a management frame are performed, whichever of capability information, operating information, or request information is indicated by the element.

The Sync Mode Support 522 is a field including capability information indicating whether the communication apparatus 102 or 103 that transmits the element supports the Sync Mode of multi-link communication. For example, in a case where this field includes 0, this field indicates that a transmission apparatus of the element does not support the Sync Mode, and in a case where this field includes 1, this field indicates that the transmission apparatus supports the Sync Mode.

In a case where operating information is indicated by a Multi-Link Capability Element, the Sync Mode Support 522 may indicate whether to execute the Sync Mode of multi-link communication. For example, in a case where the communication apparatus 102 transmits an Association Response including this element, this field indicates whether to execute the Sync Mode in communication via a link to be established by the exchange of this association. In this case, for example, in a case where this field includes 0, this field indicates that multi-link communication in the Sync Mode is not to be executed, and in a case where this field includes 1, this field indicates that multi-link communication in the Sync Mode is to be executed.

Alternatively, in a case where request information is indicated by a Multi-Link Capability Element, the Sync Mode Support 522 may indicate whether to request the execution of the Sync Mode of multi-link communication. For example, in a case where the communication apparatus 103 serving as a STA transmits an Association Request including this element, this field indicates whether the communication apparatus 103 requests the execution of the Sync Mode in multi-link communication. For example, in a case where this field includes 0, this field indicates that execution of multi-link communication in the Sync Mode is not requested, and in a case where this field includes 1, this field indicates that execution of multi-link communication in the Sync Mode is requested.

The Async Mode Support 523 is a field including capability information indicating whether the communication apparatus 102 or 103 that transmits the element supports the Async Mode of multi-link communication. For example, in a case where this field includes 0, this field indicates that a transmission apparatus of the element does not support the Async Mode, and in a case where this field includes 1, this field indicates that the transmission apparatus supports the Async Mode.

In a case where operating information is indicated by a Multi-Link Capability Element, the Async Mode Support 523 may indicate whether to execute the Async Mode of multi-link communication. For example, in a case where the communication apparatus 102 transmits an Association Response including this element, this field indicates whether to execute the Async Mode via a link to be established by the exchange of this association. In this case, for example, in a case where this field includes 0, this field indicates that multi-link communication in the Async Mode is not to be executed, and in a case where this field includes 1, this field indicates that multi-link communication in the Async Mode is to be executed. In a case where operating information is indicated by the element, in a case where the above-described Sync Mode Support 522 indicates that the Sync Mode is to be executed, this field indicates that the Async Mode is not to be executed. Similarly, in a case where the Sync Mode Support 522 indicates that the Sync Mode is not to be executed, the Async Mode Support 523 indicates that the Async Mode is to be executed.

Alternatively, in a case where request information is indicated by a Multi-Link Capability Element, the Async Mode Support 523 may indicate whether to request the execution of the Async Mode of multi-link communication. For example, in a case where the communication apparatus 103 serving as a STA transmits an Association Request including this element, this field indicates whether the communication apparatus 103 requests the execution of the Async Mode in multi-link communication. For example, in a case where this field includes 0, this field indicates that the execution of multi-link communication in the Async Mode is not requested, and in a case where this field includes 1, this field indicates that execution of multi-link communication in the Async Mode is requested.

The Semi-Async Mode Support 528 is a field including capability information indicating whether the communication apparatus 102 or 103 that transmits the element supports the Semi-Async Mode of multi-link communication. For example, in a case where this field includes 0, this field indicates that a transmission apparatus of the element does not support the Semi-Async Mode, and in a case where this field includes 1, this field indicates that the transmission apparatus supports the Semi-Async Mode.

In a case where operating information is indicated by a Multi-Link Capability Element, this field may indicate whether to execute the Semi-Async Mode of multi-link communication. For example, in a case where the communication apparatus 102 transmits an Association Response, this field indicates whether to execute the Semi-Async Mode in communication via a link to be established by the exchange of this association. For example, in a case where this field includes 0, this field indicates that multi-link communication in the Semi-Async Mode is not to be executed. In addition, for example, in a case where this field includes 1, this field indicates that multi-link communication in the Semi-Async Mode is to be executed.

Alternatively, in a case where request information is indicated by a Multi-Link Capability Element, this field may indicate whether to request the execution of the Semi-Async Mode of multi-link communication. For example, in a case where the communication apparatus 103 serving as a STA transmits an Association Request, this field indicates whether the communication apparatus 103 requests the execution of the Semi-Async Mode in multi-link communication. For example, in a case where this field includes 0, this field indicates that execution of multi-link communication in the Semi-Async Mode is not requested. In addition, for example, in a case where this field includes 1, this field indicates that execution of multi-link communication in the Semi-Async Mode is requested.

In a case where which mode of the Sync Mode, the Async Mode, and the Semi-Async Mode is to be used in a case where the communication apparatuses 102 and 103 perform multi-link communication is preset, these fields may be omitted. Specifically, the Sync Mode Support 522, the Async Mode Support 523, and the Semi-Async Mode Support 528 may be omitted.

The Total Max Link Number 524 is a field including capability information indicating the maximum number of links supported in multi-link communication by the communication apparatus 102 or 103 that transmits the element. The maximum number of links is the maximum value of the number of links that can be established by a transmission apparatus of the element with one counterpart apparatus. For example, in a case where this field includes 3 as a value, it is indicated that a transmission apparatus of the element can establish up to three links at a maximum for one counterpart apparatus. In this case, concurrently with maintaining three links with one counterpart apparatus, the transmission apparatus of the element may further maintain a plurality of links with another counterpart apparatus. Alternatively, the maximum number of links may indicate the maximum value of the number of links that can be established in multi-link communication by a transmission apparatus of the element irrespective of a counterpart apparatus. In this case, for example, in a case where this field includes 3 as a value, and a transmission apparatus of the element has established three links with a counterpart apparatus, the transmission apparatus cannot establish any more link irrespective of the counterpart apparatus. The communication apparatus 102 serving as an AP and the communication apparatus 103 serving as a STA each include, into this field, information indicating the maximum value of the number of links that can be simultaneously maintained in multi-link communication by itself.

In a case where operating information is indicated by a Multi-Link Capability Element, this field may include the number of links to be actually established in multi-link communication. For example, in a case where the communication apparatus 102 serving as an AP transmits an Association Response including this element, this field indicates the number of links to be established by the exchange of this association. Alternatively, this field may include the maximum value of the number of links that can be established in multi-link communication with the communication apparatus 103. In this case, the Total Max Link Number 524 includes a value smaller than or equal to a smaller value out of the maximum value of the number of links that can be established by its own apparatus in multi-link communication, and the maximum value of the number of links that can be established by a counterpart apparatus.

Alternatively, in a case where request information is indicated by a Multi-Link Capability Element, this field may include the number of links requested to be established in multi-link communication. For example, in a case where the communication apparatus 103 serving as a STA transmits an Association Request including this element, this field indicates the number of links requested by the communication apparatus 103 to be established by the communication apparatus 102. Alternatively, this field may include the maximum value of the number of links that can be established in multi-link communication with the communication apparatus 102. In a case where operating information or request information is indicated by a Multi-Link Capability Element, this field may be omitted.

The Band Combination Info 525 is a field including capability information indicating a frequency band supported in multi-link communication by the communication apparatus 102 or 103 that transmits the element. Table 1 shows an example of information indicated by each bit of this field. Table 1 shows, for each bit, a frequency band or a combination of frequency bands to be supported. In the present exemplary embodiment, in a case where a corresponding bit includes 0, it is indicated that the communication apparatus 102 or 103 does not support multi-link communication of the content indicated by the bit, and in a case where the corresponding bit includes 1, it is indicated that the communication apparatus 102 or 103 supports multi-link communication of the content indicated by the bit. For example, in a case where the bit 0 includes 1 in the Band Combination Info 525 transmitted by the communication apparatus 102, it is indicated that the communication apparatus 102 supports multi-link communication via different channels in the 2.4-GHz band. In addition, for example, in a case where a value of the Band Combination Info 525 is 0000111000, it is indicated that the communication apparatus 102 supports multi-link communication that uses a plurality of links in different frequency bands. In this case, it is indicated that the communication apparatus

102 does not support multi-link communication that uses a plurality of links in the same frequency band. In addition, by setting all bits of the Band Combination Info 525 to 0, it may be indicated that a transmission apparatus of a Multi-Link Capability Element does not support multi-link communication. Alternatively, it may be indicated that a transmission apparatus of the element is currently in a state of being unable to execute multi-link communication. A frequency band supported by the communication apparatuses 102 and 103 in communication via only one link and a frequency band supported by the communication apparatuses 102 and 103 in multi-link communication may be different. For example, the communication apparatuses 102 and 103 may support all of the 2.4-GHz band, the 5-GHz band, and the 6-GHz band in communication via only one link, and may support only the 5-GHz band and the 6-GHz band in multi-link communication. The correspondence relationship between each bit of the Band Combination Info 525 and the content indicated by the bit is not limited to that shown in Table 1. By increasing the number of bits of the Band Combination Info 525, the Band Combination Info 525 may be enabled to indicate a larger number of combinations of frequency bands or executability of establishment of a plurality of links in another frequency band.

TABLE 1

| Bit | Content |
| --- | --- |
| 0 | Multi-link communication is executable between channels in the 2.4-GHz band |
| 1 | Multi-link communication is executable between channels in the 5-GHz band |
| 2 | Multi-link communication is executable between channels in the 6-GHz band |
| 3 | Multi-link communication is executable between channels in the 2.4-GHz band and the 5-GHz band |
| 4 | Multi-link communication is executable between channels in the 2.4-GHz band and the 6-GHz band |
| 5 | Multi-link communication is executable between channels in the 5-GHz band and the 6-GHz band |
| 6-7 | Reserved |

In a case where operating information is indicated by a Multi-Link Capability Element, this field may indicate a frequency band to be actually used in multi-link communication. For example, in a case where the communication apparatus 102 serving as an AP transmits an Association Response including this element, this field includes information indicating a frequency band of a link to be established by the exchange of this association. For example, in a case where the communication apparatuses 102 and 103 establish a link in the 2.4-GHz band and a link in the 5-GHz band, a value of the Band Combination Info 525 becomes 00001000.

Alternatively, in a case where request information is indicated by a Multi-Link Capability Element, this field may indicate a frequency band requested to be used in multi-link communication. For example, in a case where the communication apparatus 103 serving as a STA transmits an Association Request including this element, this field indicates a frequency band in which multi-link communication is requested by the communication apparatus 103 to be executed by the communication apparatus 102. Even in a case where operating information or request information is indicated by the element, this field may include capability information indicating a frequency band supported in multi-link communication by a transmission apparatus of the element.

The Per Band Info Number 526 is a field including information indicating the number of pieces of Per Band Info included in the Per Band Info 512 to be described below. The Per Band Info 512 includes a set of Per Band Info for each frequency band supported in multi-link communication by the communication apparatus 102 or 103 that transmits a Multi-Link Capability Element. Specifically, information indicating a number that is the same as the number of frequency bands indicated by the Band Combination Info 525 is included. This is not applied to a case where information regarding a plurality of frequency bands is indicated by common Per Band Info in the Per Band Info 512 to be described below. In a case where the Per Band Info 512 to be described below is omitted, this field is omitted as well.

The Per Link Info Number 527 is a field including information indicating the number of pieces of Per Link Info included in the Per Link Info 513 to be described below. The Per Link Info 513 includes a set of Per Link Info for each link supported in multi-link communication by the communication apparatus 102 or 103 that transmits a Multi-Link Capability Element. In a case where the Per Link Info 513 to be described below is omitted, this field is omitted as well.

The Device Type 529 is a field including capability information indicating a device type in multi-link communication of the communication apparatus 102 or 103 that transmits the element. Specifically, the Device Type 529 includes information indicating a device type into which a transmission apparatus of the element is categorized, among the following four types. A device of a first type is a device that can simultaneously execute data transmission via a certain link and data reception via a different link in multi-link communication. A device of a second type is a device that, in the case of performing data transmission via a certain link, can simultaneously execute only data transmission via a different link. A device of a third type is a device that, in the case of performing data reception via a certain link, can simultaneously execute only data reception via a different link. A device of a fourth type is a device that can simultaneously maintain a plurality of links but, in the case of performing data communication via a certain link, cannot simultaneously execute data communication via a different link.

In a case where operating information is indicated by a Multi-Link Capability Element, the Device Type 529 may indicate a device type as which both apparatuses operate in multi-link communication. For example, in a case where the communication apparatus 102 transmits an Association Response including this element, this field indicates a device type as which a communication apparatus operates in communication via a link to be established by the exchange of this association. For example, in a case where information indicating the second type is transmitted as operating information, even if the communication apparatus 102 is an apparatus operable as the first type, the communication apparatus 102 operates as an apparatus of the second type in communication via a link to be established by the exchange of this association.

Alternatively, in a case where request information is indicated by a Multi-Link Capability Element, the Device Type 529 may indicate that a communication apparatus requests a device type as which the communication apparatus operates in multi-link communication. For example, in a case where the communication apparatus 103 serving as a STA transmits an Association Request including this element, this field indicates a device type as which the communication apparatus 103 is desired to operate in multi-link communication. For example, in a case where this field includes information indicating the second type, it is indicated that the communication apparatus 103 requests that the communication apparatus 103 operates as an apparatus of the second type in multi-link communication with the communication apparatus 102.

The Per Band Info 512 is a field including a Band ID 531, a Supported Bandwidth 532, a Supported CH 533, and an Async Mode CH Distance 534. In addition to these fields, the Per Band Info 512 further includes a Max Link Number 535 and a Supported Number of Special Stream (Nss) 536. A set of Per Band Info 512 is included in a Multi-Link Capability Element for each frequency indicated by the Band ID 531 to be described below.

The Band ID 531 is a field including information to identify a frequency band. Table 2 shows an example of a correspondence relationship between a value included in the Band ID 531, and a frequency band indicated by the value. For example, in a case where the Band ID 531 includes 0 as a value, the Per Band Info 512 including this Band ID 531 is information indicating information common to links of multi-link communication in the 2.4-GHz band. A correspondence relationship between a value included in the Band ID 531, and a frequency band indicated by the value is not limited to this. By increasing the number of bits of the Band ID 531, the Band ID 531 may be enabled to indicate a larger number of frequency bands.

TABLE 2

| Value | Frequency band |
| --- | --- |
| 0 | 2.4-GHz band |
| 1 | 5-GHz band |
| 2 | 6-GHz band |

The Supported Bandwidth 532 is a field including capability information indicating a bandwidth supported by the communication apparatus 102 or 103 that has transmitted the element, in a frequency band indicated by the Band ID 531. The bandwidth indicated here is information indicating a bandwidth supported for one link by a transmission apparatus of the element in performing multi-link communication in a frequency band indicated by the Band ID 531. Table 3 shows an example of a correspondence relationship between a value included in the Supported Bandwidth 532, and a bandwidth indicated by the value. For example, in a case where the Supported Bandwidth 532 includes 0 as a value, it is indicated that a bandwidth supported by a transmission apparatus of the element in a frequency band indicated by the Band ID 531 is 20-MHz bandwidth. In a case where a value of the Supported Bandwidth 532 is larger than or equal to 1, when establishing a link of multi-link communication, a transmission apparatus of the element can support all bandwidths corresponding to values smaller than or equal to the value. For example, in a case where a value of the Supported Bandwidth 532 is 2, a transmission apparatus supports all bandwidths of 20-MHz, 40 MHz, and 80 MHz as bandwidths of the link. A bandwidth supported by the communication apparatuses 102 and 103 in communication via only one link and a bandwidth supported by the communication apparatuses 102 and 103 in multi-link communication may be different. For example, the communication apparatuses 102 and 103 may support 80 MHz as a bandwidth in the 5-GHz band in communication via only one link, and may support 20 MHz as a bandwidth in multi-link communication. A correspondence relationship between a value included in the Supported Bandwidth 532, and a bandwidth indicated by the value is not limited to this. By increasing the number of bits of the Supported Bandwidth 532, the Supported Bandwidth 532 may be enabled to indicate a larger number of frequency bands.

TABLE 3

| Value | Bandwidth |
| --- | --- |
| 0 | 20-MHz bandwidth |
| 1 | 40-MHz bandwidth |
| 2 | 80-MHz bandwidth |
| 3 | 160-MHz bandwidth |
| 4 | 240-MHz bandwidth |
| 5 | 320-MHz bandwidth |

In a case where operating information is indicated by a Multi-Link Capability Element, this field may indicate a bandwidth to be actually used in multi-link communication. For example, in a case where the communication apparatus 102 serving as an AP transmits an Association Response including this element, this field includes information indicating a bandwidth of a link to be established by the exchange of this association. For example, in a case where the communication apparatuses 102 and 103 establish a link of a 40-MHz bandwidth in the 2.4-GHz band, the value of the Supported Bandwidth 532 becomes 1.

Alternatively, in a case where request information is indicated by a Multi-Link Capability Element, this field may indicate a bandwidth requested to be used in multi-link communication. In a case where the communication apparatus 103 serving as a STA transmits an Association Request including this element, this field indicates a bandwidth requested by the communication apparatus 103 to be used by the communication apparatus 102. Even in a case where operating information or request information is indicated by the element, this field may include capability information indicating a bandwidth supported in multi-link communication by a transmission apparatus of the element.

The Supported CH 533 is a field including capability information indicating a channel supported by the communication apparatus 102 or 103 that has transmitted the element, in a frequency band indicated by the Band ID 531. The channel to be indicated here is information indicating a channel supported in multi-link communication by a transmission apparatus of the element in a frequency band indicated by the Band ID 531. Table 4 shows an example of a correspondence relationship between each bit of the Supported CH 533, and a channel indicated by the bit. For example, in a case where a certain bit includes 0 as a value, it is indicated that a transmission apparatus of the element does not support a channel indicated by the bit, and in a case where a certain bit includes 1 as a value, it is indicated that the transmission apparatus supports a channel indicated by the bit. For example, in a case where the Supported CH 533 includes 0000010010100 as a value, it is indicated that a transmission apparatus of this field supports multi-link communication via a 3 ch, the 5 ch, and an 8 ch. A channel supported by the communication apparatuses 102 and 103 in communication via only one link and a channel supported by the communication apparatuses 102 and 103 in multi-link communication may be different. For example, the communication apparatuses 102 and 103 may support all channels from 1 to 13 ch in communication via only one link, and may support only a part of channels such as the 1 ch and the 5 ch in multi-link communication. A correspondence relationship between each bit of the Supported CH 533 and a channel indicated by the bit is not limited to the correspondence relationship shown in Table 4. By increasing the number of bits of the Supported CH 533, the Supported CH 533 may be enabled to indicate a larger number of channels. For example, Table 4 shows only channels in the 2.4-GHz band as an example, but the Supported CH 533 may be enabled to indicate channels in the 5-GHz band and 6-GHz band using 13 and larger bits by increasing the number of bits. Alternatively, in a case where information indicating the 5-GHz band is included in the Band ID 531, channels in the 5-GHz band may be indicated in ascending order from 0 bit. Similarly, in a case where information indicating the 6-GHz band is included in the Band ID 531, channels in the 6-GHz band may be indicated in ascending order from 0 bit.

TABLE 4

| Bit | Channel |
| --- | --- |
| 0 | 1 CH |
| 1 | 2 CH |
| 2 | 3 CH |
| . . . | . . . |
| 12 | 13 CH |

In a case where operating information is indicated by a Multi-Link Capability Element, this field may indicate a channel to be actually used in multi-link communication. For example, in a case where the communication apparatus 102 serving as an AP transmits an Association Response including this element, this field includes information indicating a channel of a link to be established by the exchange of this association. For example, in a case where the communication apparatuses 102 and 103 establish links via the 1 ch and the 4 ch in the 2.4-GHz band, a value of the Supported CH 533 becomes 0000000001001.

Alternatively, in a case where request information is indicated by a Multi-Link Capability Element, this field may indicate a channel requested to be used in multi-link communication. For example, in a case where the communication apparatus 103 serving as a STA transmits an Association Request including this element, this field indicates a channel via which a link is requested by the communication apparatus 103 to be established by the communication apparatus 102. Even in a case where operating information or request information is indicated by the element, this field may include capability information indicating a channel supported in multi-link communication by a transmission apparatus of the element.

The Async Mode CH Distance 534 is a field including capability information indicating a channel interval required in the Async Mode by a transmission apparatus that has transmitted the element, in a frequency band indicated by the Band ID 531. In the Async Mode, because communications via links are asynchronously performed, if channels used by the respective links are close, communications might interfere with each other. Because a channel interval between links that is required for appropriately decoding signals of the links varies depending on a communication apparatus, capability information is notified using this field. In a case where the Async Mode CH Distance 534 includes 4 as a value, for example, it is indicated that a transmission apparatus of the element requires a channel interval of at least 4 ch or more in the Async Mode. In a case where the above-described Async Mode Support 523 includes information indicating that the Async Mode is not supported, this field may include 0 as a value, or this field may be omitted. In the present exemplary embodiment, a channel interval required in the Async Mode is indicated for each frequency band indicated by the Band ID 531, but the configuration is not limited to this. Information common to frequency bands may be indicated. Specifically, this field may be included in the Common Info 511.

In a case where operating information is indicated by a Multi-Link Capability Element, this field may include information indicating an interval of channels to be actually used in the Async Mode of multi-link communication. For example, in a case where the communication apparatus 102 serving as an AP transmits an Association Response including this element, this field includes information indicating a channel interval between a plurality of links to be established by the exchange of this association.

Alternatively, in a case where request information is indicated by a Multi-Link Capability Element, this field may include information indicating an interval of channels requested to be used in the Async Mode of multi-link communication. Information indicating the smallest channel interval supported in the Async Mode of multi-link communication with a counterpart apparatus may be included. In a case where operating information is indicated by the element, this field includes a value larger than or equal to a lager channel interval out of a channel interval indicated by the communication apparatus 102 as capability information, and a channel interval indicated by the communication apparatus 103 as capability information. In a case where the Async Mode Support 523 includes information indicating that the Async Mode is not to be executed, or in a case where the Async Mode Support 523 is omitted, this field may include 0 as a value. Alternatively, this field may be omitted. Alternatively, in a case where the communication apparatus 103 serving as a STA transmits an Association Request including this element, this field indicates a channel interval requested by the communication apparatus 103 in the Async Mode of multi-link communication with the communication apparatus 102. In a case where the communication apparatus 103 does not request execution of the Async Mode, this field may include 0 as a value, or this field may be omitted. In a case where operating information or request information is indicated by a Multi-Link Capability Element, this field may be omitted.

The Max Link Number 535 is a field including capability information indicating the maximum number of links supported by a transmission apparatus that has transmitted the element, in the case of performing multi-link communication in a frequency band indicated by the Band ID 531. In a case where the above-described Band Combination Info 525 does not include information indicating that multi-link communication via links in the same frequency band is supported, this field may include 0 as a value. Alternatively, this field may be omitted. In the present exemplary embodiment, the maximum number of links can be indicated for each frequency band, but the configuration is not limited to this. The maximum number of links may be indicated as information common to all frequency bands. Specifically, this field may be included in the Common Info 511.

In a case where operating information is indicated by a Multi-Link Capability Element, this field may indicate the total number of links to be actually used in a frequency band indicated by the Band ID 531, in multi-link communication. For example, in a case where the communication apparatus 102 serving as an AP transmits an Association Response including this element, this field includes information indicating the number of one or more links to be established by the exchange of this association. For example, in a case where the communication apparatuses 102 and 103 establish two links in the 2.4-GHz band, this field includes 2 as a value.

Alternatively, in a case where request information is indicated by a Multi-Link Capability Element, this field may indicate the total number of links requested to be used in a frequency band indicated by the Band ID 531, in multi-link communication. For example, in a case where the communication apparatus 103 serving as a STA transmits an Association Request including this element, this field indicates the number of links requested by the communication apparatus 103 to be established by the communication apparatus 102. Even in a case where operating information or request information is indicated by the element, this field may include capability information indicating the maximum number of links that can be established by a transmission apparatus of the element in multi-link communication.

The Supported Nss 536 is a field including capability information indicating the maximum number of (spacial) streams supported by a transmission apparatus that has transmitted the element, in the case of performing multi-link communication in a frequency band indicated by the Band ID 531. The Nss stands for a Number of Special Streams. The number of streams indicated by this field is the number of streams in MIMO communication. In a case where MIMO communication is not supported in multi-link communication in a frequency band indicated by the Band ID 531, this field includes 0 or 1 as a value, or this field is omitted. In the present exemplary embodiment, the maximum number of streams can be indicated for each frequency band, but the configuration is not limited to this. The maximum number of streams may be indicated as information common to all frequency bands. Specifically, this field may be included in the Common Info 511.

In a case where operating information is indicated by a Multi-Link Capability Element, this field may indicate the number of streams to be actually used in a frequency band indicated by the Band ID 531, in multi-link communication. For example, in a case where the communication apparatus 102 serving as an AP transmits an Association Response including this element, this field includes information indicating the number of streams of MIMO communication to be actually executed by the exchange of this association. For example, in a case where the communication apparatuses 102 and 103 perform MIMO communication with the number of streams being 3, via a link for performing multi-link communication in the 2.4-GHz band, this field includes 3 as a value. In a case where MIMO communication is not to be performed, this field may include 0 or 1 as a value, or this field may be omitted.

Alternatively, in a case where request information is indicated by a Multi-Link Capability Element, this field may indicate the number of streams requested to be used in a frequency band indicated by the Band ID 531, in multi-link communication. In a case where the communication apparatus 103 serving as a STA transmits an Association Request including this element, this field indicates the number of streams requested by the communication apparatus 103 in MIMO communication in multi-link communication. In a case where the communication apparatus 103 does not request MIMO communication, this field may include 0 or 1 as a value, or this field may be omitted. Even in a case where operating information or request information is indicated by the element, this field may include capability information indicating the maximum number of streams supported by a transmission apparatus of the element in MIMO communication in multi-link communication.

The Per Link Info 513 is a field including fields of a Link ID 541, a Band ID 542, a Bandwidth 543, a CH 544, and a Nss 545. In a case where capability information is indicated by a Multi-Link Capability Element, the Per Link Info 513 indicates information regarding a channel via which a transmission apparatus of the element supports multi-link communication. In this case, a set of Per Link Info 513 is included by the number of channels (links) supported in multi-link communication by a transmission apparatus of the element. Alternatively, in a case where capability information is indicated by the element, and in a case where a link of multi-link communication has already been established, the Per Link Info 513 indicates information regarding the already-established link. In this case, a set of Per Link Info 513 may be included by the number of already-established links. In this case, a link for which information is indicated by the communication apparatus 102 using the Per Link Info 513 is a link established with at least one of the communication apparatus 103 and a different communication apparatus. In this case, a link for which information is indicated by the communication apparatus 103 using the Per Link Info 513 is a link established with at least one of the communication apparatus 103 and a different communication apparatus. Alternatively, in a case where capability information is indicated by the element, the Per Link Info 513 need not be included. A case where operating information is indicated by a Multi-Link Capability Element, and the communication apparatus 102 serving as an AP transmits an Association Response including the element is not limited to this. In this case, the Per Link Info 513 indicates information regarding a link to be established by the exchange of this association. In this case, the Per Link Info 513 is included by the number of links to be established by the exchange of this association. In addition, in a case where request information is indicated by the communication apparatus 103 transmitting an Association Request including the element, the Per Link Info 513 indicates information regarding a link requested by the communication apparatus 103 to be established. In this case, the Per Link Info 513 is included by the number of links requested by the communication apparatus 103 to be established.

The Link ID 541 is a field including an identifier to identify a link.

The Band ID 542 is a field including information indicating a frequency band to which a link indicated by the Link ID 541 belongs. This field is indicated similarly to the Band ID 531.

The Bandwidth 543 is a field including information indicating a bandwidth in a link indicated by the Link ID 541. This field is indicated similarly to the Supported Bandwidth 532. In a case where capability information is indicated by a Multi-Link Capability Element, this field indicates a bandwidth supported in a link indicated by the Link ID 541. In a case where operating information is indicated by the communication apparatus 102 serving as an AP transmitting an Association Response including this element, this field indicates a bandwidth to be used in a link indicated by the Link ID 541. In a case where request information is indicated by the communication apparatus 103 serving as a STA transmitting an Association Request including this element, this field indicates a bandwidth requested by the communication apparatus 103 in a link indicated by the Link ID 541.

The CH 544 is a field including information indicating a frequency channel of a link indicated by the Link ID 541. This field may just include the number indicating a channel. Alternatively, a channel may be indicated as shown in Table 4. In a case where capability information is indicated by a Multi-Link Capability Element, this field indicates a channel supported in a link indicated by the Link ID 541. In a case where operating information is indicated by the communication apparatus 102 serving as an AP transmitting an Association Response including this element, this field indicates a channel to be used in a link indicated by the Link ID 541. In a case where request information is indicated by the communication apparatus 103 serving as a STA transmitting an Association Request including this element, this field indicates a channel requested by the communication apparatus 103 in a link indicated by the Link ID 541.

The Nss 545 is a field including information indicating the number of streams of MIMO communication in a link indicated by the Link ID 541. In a case where MIMO communication is not to be performed, this field may include 0 or 1 as a value, or this field may be omitted. In a case where capability information is indicated by a Multi-Link Capability Element, this field indicates the maximum number of streams supported in a link indicated by the Link ID 541. In a case where operating information is indicated by the communication apparatus 102 serving as an AP transmitting an Association Response including this element, this field indicates the number of streams to be used in a link indicated by the Link ID 541. In a case where request information is indicated by the communication apparatus 103 transmitting an Association Request including this element, this field indicates the number of streams requested by the communication apparatus 103 in a link indicated by the Link ID 541.

By transmitting and receiving a MAC frame including the above-described Multi-Link Capability Element, the communication apparatuses 102 and 103 exchange capability information, operating information, and request information of multi-link communication. In the present exemplary embodiment, capability information, operating information, and request information of multi-link communication are indicated by the same Multi-Link Capability Element, but the configuration is not limited to this. Capability information and operating information or capability information and request information may be indicated by different information elements. In this case, for example, capability information may be indicated by an element including the Common Info 511 and the Per Band Info 512. In addition, operating information and request information may be indicated by an element including the Common Info 511 and the Per Link Info 513. In a case where capability information is indicated by a Multi-Link Capability Element, a part of fields may indicate operating information or request information. Alternatively, in a case where operating information or request information is indicated by a Multi-Link Capability Element, a part of fields may indicate capability information.

The Multi-Link Capability Element illustrated in FIG. 5 includes fields of the Primary CH 521, the Supported CH 533, and the CH 544 as information indicating a frequency channel. Nevertheless, the configuration is not limited to this. A Multi-Link Capability Element is only required to include at least any one of the Primary CH 521, the Supported CH 533, and the CH 544 as information indicating a frequency channel.

The names of the fields, the number of fields, and the order of fields are not limited to those illustrated in FIG. 5. Any field may be included prior to or subsequent to an arbitrary field of the fields illustrated in FIG. 5. In addition, a field included in the Common Info 511 may be included in the Per Band Info 512 or the Per Link Info 513. Fields included in the Per Band Info 512 and the Per Link Info 513 may also be included in other fields, or may be included in the Common Info 511. In addition, any of the fields illustrated in FIG. 5 may be omitted.

FIGS. 8 and 9 illustrate information included in a body part of a MAC frame of a Beacon and a Probe Response to be transmitted by the communication apparatus 102. A frame format of a MAC frame can be divided into a header part and a body part that are to be transmitted and received in the following order. More specifically, the header part is first transmitted and received, and the body part is transmitted and received next. The header part includes information indicating a type of a MAC frame. Specifically, in the case of a Beacon, for example, a header part includes information indicating that a type of a MAC frame is a management frame, and furthermore, a subtype is a Beacon. Similarly, in the case of a Probe Response, a header part includes information indicating that a type of a MAC frame is a management frame, and a subtype is a Probe Response.

FIG. 8 illustrates information included in a body part of a MAC frame of a Beacon to be transmitted by the communication apparatus 102. The Beacon includes various types of information indicated on columns of information, as elements. These pieces of information are transmitted and received in an order indicated by an Order column. The Beacon need not include all pieces of information illustrated in FIG. 8, and is only required to include at least part of the information.

Among these pieces of information, Timestamp with Order=1, Beacon interval with Order=2, and Capability Information with Order=3 correspond to information inevitably included in the Beacon. In addition, SSID with Order=4, and Supported Rates and BSS Membership Selectors with Order=5 also correspond to information inevitably included in the Beacon.

The Timestamp includes information indicating a value of a timing synchronization function (TSF) timer of a transmission apparatus of a MAC frame.

The Beacon interval includes information indicating a transmission interval of a Beacon to be transmitted by a transmission apparatus of a MAC frame.

The Capability Information includes information indicating whether a transmission apparatus of a MAC frame can execute a point coordination function (PCF). The Capability Information also includes information indicating whether a transmission apparatus of a MAC frame requires encryption in data communication.

The SSID includes information indicating an identifier of an extended service set (ESS) or an independent basic service set (IBSS) of a transmission apparatus of a MAC frame. As an identifier of the ESS, an ESSID being an identification name of an AP is included. Generally, an SSID is included as an ESSID.

The Supported Rates and BSS Membership Selectors includes information indicating a wireless transmission rate supported by a transmission apparatus of the Beacon.

Each piece of information to be communicated later than the Supported Rates and BSS Membership Selectors may be included in a MAC frame, but need not be included.

In the present exemplary embodiment, the switch destination information illustrated in FIG. 10 to be described below is arranged as an element with Order=Z that is to be communicated later than an EHT Capabilities Element and an EHT Operation Element as illustrated in FIG. 8. In this example, the name of an element indicating switch destination information of multi-link communication is switch destination link information, but the name is not limited to this. For example, a name such as a Multi-link report element may be used. The switch destination information is arranged in such a manner as to be communicated earlier than a Vendor Specific Element to be communicated lastly in a MAC frame.

The EHT Capabilities Element includes information indicating capability of a transmission apparatus of a MAC frame that relates to communication complying with the IEEE 802.11be standard. Specifically, for example, information (EHT PHY Capabilities Information) indicating capability of a physical layer (PHY) of a transmission apparatus of a MAC frame in communication complying with the IEEE 802.11be standard is included. In addition to or in place of this, information (EHT MAC Capabilities Information) indicating capability of MAC of a transmission apparatus of a MAC frame in communication complying with the IEEE 802.11be standard may be included. By transmitting the EHT Capabilities Element, a transmission apparatus of a MAC frame can indicate that the transmission apparatus is an apparatus that can execute communication complying with the IEEE 802.11be standard. The EHT Capabilities Element may be communicated next to an element with Order=87 in the Beacon.

The EHT Operation Element includes information to control a communication apparatus in communication complying with the IEEE 802.11be standard. An operation of a communication apparatus supporting communication complying with the IEEE 802.11be standard, and participating in a BSS complying with the IEEE 802.11be standard is controlled by the EHT Operation Element. The EHT Operation Element may be communicated next to the EHT Capabilities Element in the Beacon.

In a case where a transmission apparatus of a Beacon transmits a Beacon including switch destination information of multi-link communication, the Beacon includes at least one of the EHT Capabilities Element and the EHT Operation Element. By switch destination information of multi-link communication being communicated later than at least one of the EHT Capabilities Element and the EHT Operation Element, compatibility can be ensured. Because a communication apparatus complying with only standards formulated earlier than the IEEE 802.11ax standard cannot interpret the content of switch destination information of multi-link communication even if the communication apparatus receives the switch destination information, the communication apparatus discards the switch destination information and subsequent information. For example, if switch destination information is communicated earlier than information regarding communication complying with the IEEE 802.11ax standard, a reception apparatus might become unable to acquire information regarding communication complying with the IEEE 802.11ax standard, from a transmission apparatus. By arranging switch destination information of multi-link communication in such a manner as to be communicated later than the EHT Capabilities and the EHT Operation, a reception apparatus of the Beacon can acquire information regarding communication complying with a standard formulated earlier than the IEEE 802.11be standard.

An arrangement position is not limited to this. Switch destination information of multi-link communication is only required to be arranged in such a manner as to be communicated later than at least the SSID and the Supported Rates and BSS Membership Selectors in the Beacon. By switch destination information of multi-link communication being arranged in such a manner as to be communicated later than information inevitably included in the Beacon, a reception apparatus complying with only a standard formulated earlier than the IEEE 802.11ax standard can also acquire information inevitably included in the Beacon. With this configuration, compatibility with a legacy terminal (complying with only a standard formulated earlier than the IEEE 802.11ax standard) can be ensured.

Similarly, the Multi-link Capability Element illustrated in FIG. 5 is also arranged in such a manner as to be communicated later than at least one of the EHT Capabilities Element and the EHT Operation Element. With this configuration, compatibility with a legacy terminal can be ensured. An arrangement position is not limited to this, and the Multi-link Capability Element may be arranged in such a manner as to be communicated later than the SSID or the Supported Rates and BSS Membership Selectors. With this configuration, compatibility with a legacy terminal can be ensured.

FIG. 9 illustrates information included in a body part of a MAC frame of a Probe Response to be transmitted by the communication apparatus 103. The Probe Response includes various types of information indicated on columns of information, as elements. These pieces of information are transmitted and received in an order indicated by an Order column. The Probe Response need not include all pieces of information illustrated in FIG. 9, and is only required to include at least part of the information.

Similarly to the Beacon, the Probe Response also inevitably includes Timestamp with Order=1, Beacon interval with Order=2, and Capability Information with Order=3. In addition to these, SSID with Order=4 is inevitably included. Unlike the Beacon, Supported Rates and BSS Membership Selectors with Order=5 may be included, but need not be included.

In the present exemplary embodiment, switch destination information illustrated in FIG. 10 to be described below is arranged as an element with Order=Z that is to be communicated later than the EHT Capabilities Element and the EHT Operation Element as illustrated in FIG. 9. In this example, the name of an element indicating switch destination information of multi-link communication is switch destination link information, but the name is not limited to this. For example, a name such as a Multi-link report element may be used. The switch destination information is arranged in such a manner as to be communicated earlier than a Vendor Specific Element to be communicated second last in a MAC frame. By switch destination information being arranged in such a manner as to be communicated later than at least one of the EHT Capabilities Element and the EHT Operation Element, compatibility with a legacy terminal can be ensured.

An arrangement position is not limited to this, and switch destination information of multi-link communication is only required to be arranged in such a manner as to be communicated later than the SSID in the Probe Response. With this configuration, compatibility with a legacy terminal can be ensured.

In a case where a Probe Request includes information indicating that switch destination information of multi-link communication is requested, a transmission apparatus of the Probe Response may communicate switch destination information following an SSID without communicating other elements. By avoiding transmitting unnecessary elements, the transmission apparatus of the Probe Response can reduce the number of elements to be communicated and reduce overhead.

The Multi-link Capability Element illustrated in FIG. 5 is also arranged in such a manner as to be communicated later than at least one of the EHT Capabilities Element and the EHT Operation Element. With this configuration, compatibility with a legacy terminal can be ensured. An arrangement position is not limited to this, and the Multi-link Capability Element may be arranged in such a manner as to be communicated later than an SSID. With this configuration, compatibility with a legacy terminal can be ensured.

Figure 10:
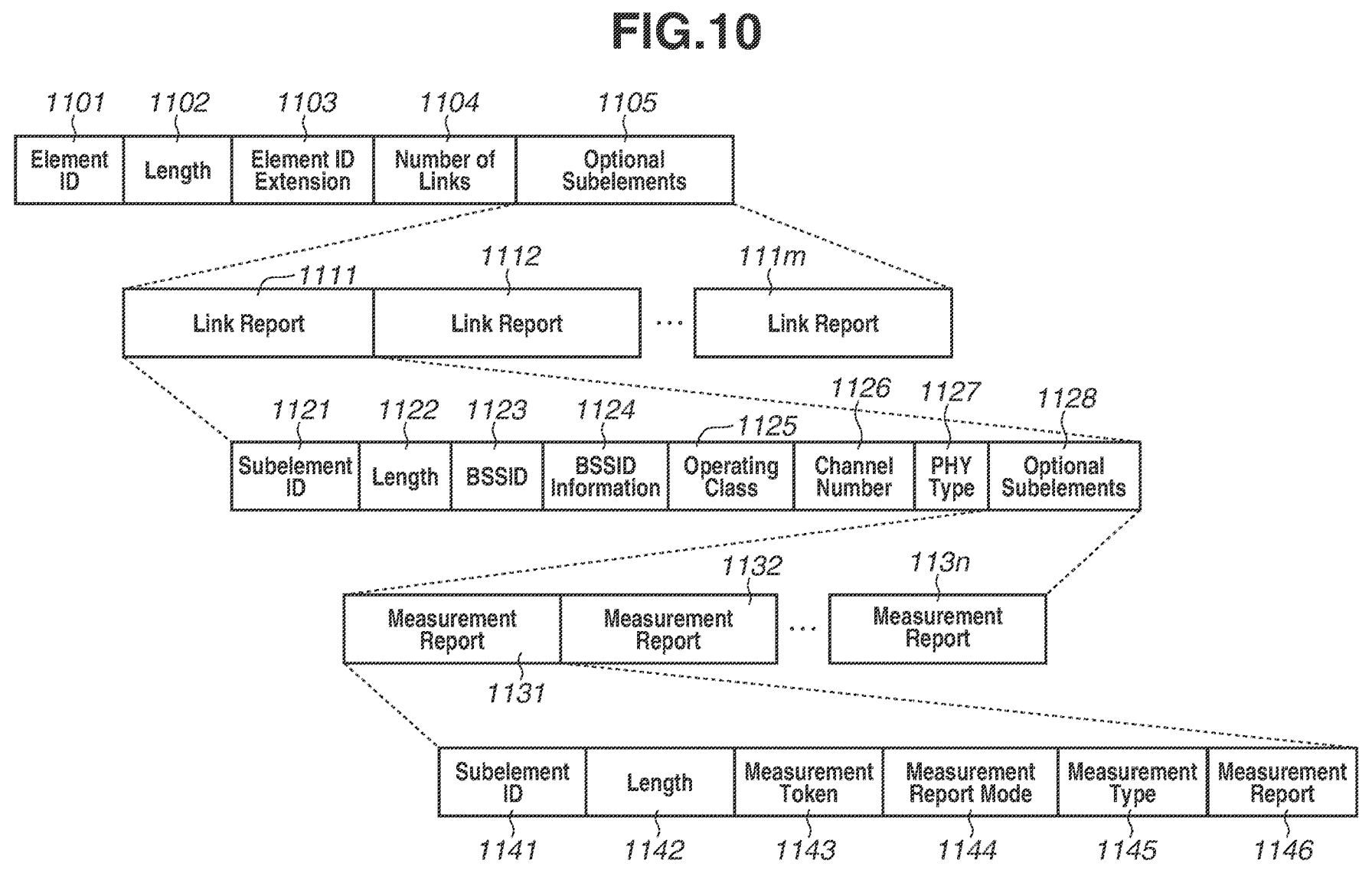

FIG. 10 illustrates an example of a frame format of a switch destination link information element (information element). The switch destination link information with Order=Z that is illustrated in FIG. 8 or 9 includes information as illustrated in FIG. 10.

The switch destination link information element includes fields of an Element ID 1101, a Length 1102, an Element ID Extension 1103, and a Number of Links 1104. In addition to this, the switch destination link information element includes a field of Optional Subelements 1105. The communication apparatus 102 generates the switch destination link information element illustrated in FIG. 10, in order from the Element ID 1101, and transmits the switch destination link information element to a different communication apparatus. In this case, the communication apparatus 102 transmits the switch destination link information element to a different communication apparatus after generating all fields in the frame. Alternatively, the communication apparatus 102 may perform transmission concurrently with the generation of fields. Specifically, the communication apparatus 102 may perform generation of the Length 1102 concurrently with the transmission of the generated Element ID 1101, for example.

The Element ID 1101 includes a value indicating that this element is a switch destination link information element.

The Length 1102 includes information designating the number of octets of the switch destination link information element following the Length 1102 (not including the Length 1102).

The Element ID Extension 1103 includes a value to identify a different element to which the same Element ID is allocated. In a case where an Element ID Extension is not allocated to a switch destination link information element in the IEEE 802.11be standard, this field is omitted.

The Number of Links 1104 includes information indicating the number of links for which information is indicated by the switch destination link information element. This field is a field in an integer format without a sign. The length of the field is 9 bits in such a manner that 0 to 511 can be identified, but the length may be larger than or equal to, or smaller than or equal to this. By this field being included in switch destination link information, a reception apparatus of the switch destination link information can identify the number of links for which information is indicated by the switch destination link information element, without analyzing the following Optional Subelements 1105. Because the number of links for which information is indicated can be acquired by analyzing the Optional Subelements 1105, this field may be omitted.

The Optional Subelements 1105 indicate information regarding each link. The Optional Subelements 1105 include, as subelements (or subfields), Link Reports 1111 to 111*m* by the number corresponding to the number of links for which information is indicated by the switch destination link information element.

The communication apparatus 102 that transmits switch destination link information transmits, as switch destination link information, information regarding at least one of links excluding a link to be used for transmission of the switch destination link information, among links already established with the communication apparatus 103. In addition to this, the communication apparatus 102 may transmit information regarding a link that can be established with the communication apparatus 103 from now. Specifically, the communication apparatus 102 transmits information regarding a wireless network that has been already constructed by the communication apparatus 102, in which a link with the communication apparatus 103 has not been established. In addition to these pieces of link information, the communication apparatus 102 may also transmit information including information regarding a link to be used for transmission of the switch destination link information.

The Link Reports 1111 to 111*m* each include fields of a Subelement ID 1121, a Length 1122, a BSSID 1123, BSSID Information 1124, and an Operating Class 1125. In addition to these fields, the Link Reports 1111 to 111*m* each include fields of a Channel Number 1126, a PHY Type 1127, and Optional Subelements 1128.

In the present exemplary embodiment, as a frame format of a Link Report, a frame format of a Neighbor Report element defined in an IEEE 802.11 series standard is used. The frame format of the Link Report is not limited to the frame format of the Neighbor Report.

The Subelement ID 1121 includes information indicating that this subelement is a Link Report. In a case where a Neighbor Report is diverted as a Link Report, 52 is included as an ID indicating a Neighbor Report. This field may be omitted.

The Length 1122 includes information designating the number of octets of the Link Report following the Length 1122 (not including the Length 1122).

The BSSID 1123 includes information indicating a BSSID, as identification information of a wireless network in which a link for which information is indicated by a Link Report is constructed. Alternatively, in place of or in addition to the BSSID 1123, a field of a Link ID may be included as identification information of the link. In a case where information regarding a link that has not been constructed yet is indicated, a Link ID field need not be included. Alternatively, a Link ID field may include a value indicating that a link has not been established.

The BSSID Information 1124 includes information indicating whether a wireless network indicated by the BSSID 1123 enables communication complying with the IEEE 802.11be standard. In addition to this, information indicating whether a wireless network indicated by the BSSID 1123 enables communication complying with the IEEE 802.11ax standard or the IEEE802.11n standard may be included. This field may be omitted.

The Operating Class 1125 includes information indicating a set of frequency channels via which the communication apparatus 102 can execute communication. This field may be omitted.

The Channel Number 1126 includes information indicating a frequency channel to be used in a wireless network indicated by the BSSID 1123. In a case where information regarding an already-established link is indicated in a Link Report, the Channel Number 1126 may include information indicating a frequency channel used in the link.

The PHY Type 1127 includes information indicating a physical medium type of a MAC frame including a switch destination link information element.

The Optional Subelements 1128 include information regarding a link. The Optional Subelements 1128 include one or more Measurement Report fields. Measurement Reports 1131 to 113*n* are included in the Optional Subelements 1128 by the number of types of information regarding the corresponding link. As information regarding a link, information indicating an acquisition possibility of a transmission chance of the communication apparatus 102 or 103 is included as information to be used for determination of switch or selection of a link in multi-link communication. For example, information indicating a rate of a period in which a frequency channel used by a corresponding link is busy, or a rate of a period in which the frequency channel is not busy, with respect to a predetermined period is included as information regarding the link. Alternatively, information indicating whether a signal or radar transmitted from a different communication apparatus has been detected in a frequency channel used by the corresponding link is included. Alternatively, information indicating the power of a signal received by the communication apparatus 102 in a frequency channel used by the corresponding link is included. The power of a signal received by the communication apparatus 102 refers to the power of a signal transmitted from the communication apparatus 103 and received by the communication apparatus 102. Alternatively, information indicating a signal-to-noise ratio in a frequency channel used by the corresponding link, and information regarding total power of noise and interference waves is included. Alternatively, information regarding the numbers of management frames and data frames received via a corresponding link or a wireless network in which the corresponding link is established is included. The communication apparatus 102 is only required to include at least one of the above-described piece of information into the Optional Subelements 1128 as a Measurement Report for one link.

The Measurement Reports 1131 to 113*n* each include fields of a Subelement ID 1141, a Length 1142, and a Measurement Token 1143. In addition to these fields, the Measurement Reports 1131 to 113*n* each include fields of a Measurement Report Mode 1144, a Measurement Type 1145, and a Measurement Report 1146.

The Subelement ID 1141 includes information indicating that this subelement is a Measurement Report. This field may be omitted.

The Length 1142 includes information designating the number of octets of the Measurement Report following the Length 1142 (not including the Length 1142).

The Measurement Token 1143 includes the same value as a Measurement Token of a Measurement Request element received from the communication apparatus 103. By transmitting a Probe Request including a Measurement Request element, to the communication apparatus 102, the communication apparatus 103 can request the communication apparatus 102 to transmit switch destination link information. The communication apparatus 102 may transmit a Measurement Request frame including a Measurement Request element, in place of the Probe Request. The Measurement Request frame may be transmitted at an arbitrary timing. In a case where the communication apparatus 102 transmits the Measurement Reports 1131 to 113*n* not based on the reception of a Measurement Request element, 0 is set in the Measurement Token 1143. This field may be omitted.

The Measurement Type 1145 includes information indicating a type of information included in the Measurement Report 1146 to be described below. The information included in the Measurement Report 1146 is the above-described information regarding a link.

In the present exemplary embodiment, a Type indicating information regarding a type that is not applied to a Neighbor Report element but applied to a different element in a standard formulated earlier than the IEEE 802.11ax standard may be designated as a Measurement Type. For example, Basic, Clear Channel Assessment (CCA), or Receive Power Indicator (RPI) Histogram may be designated as a Type. Alternatively, Channel Load, Noise Histogram, Beacon, or Frame may be designated as a Type.

The Measurement Report field 1146 includes information indicating information regarding a frequency channel, a measurement start time, and a length of a measurement period irrespective of a Measurement Type. Then, information regarding a type indicated by the Measurement Type under these conditions is included. The Measurement Report field is sometimes called a [Measurement Type name] Report based on a type designated as a Measurement Type. For example, in a case where a Measurement Type is Basic, the Measurement Report field is called a Basic Report.

In a case where the Measurement Type 1145 indicates Basic, the Measurement Report 1146 (Basic Report) includes information indicating whether an effective MAC protocol data unit (MPDU) has been received from a different BSS. In addition to or in place of the information, information indicating whether a short training symbol sequence to which an effective signal field is not connected has been received is included. In addition to or in place of these piece of information, information indicating whether large power that is not identifiable as one of radar waves, an OFDM preamble, or an effective MPDU has been received, or whether radar waves have been received is included.

In a case where the Measurement Type 1145 indicates CCA, the Measurement Report 1146 (CCA Report) includes information indicating a rate of a time in which a frequency channel is busy.

In a case where the Measurement Type 1145 indicates RPI Histogram, the Measurement Report 1146 includes information indicating a frequency distribution in which power observed by an antenna is used as a class. In this case, the Measurement Report 1146 may be called an RPI Histogram Report.

In a case where the Measurement Type 1145 indicates Channel Load, the Measurement Report 1146 (Channel Load Report) includes information indicating a rate of a time in which a frequency channel is busy. In addition to or in place of this, information regarding switch to a new bandwidth is included.

In a case where the Measurement Type 1145 indicates Noise Histogram, the Measurement Report 1146 (Noise Histogram Report) includes information indicating a total average power of noise and interference waves. In addition to or in place of this, information indicating a frequency distribution in which total power of noise and interference waves is used as a class is included.

In a case where the Measurement Type 1145 indicates the Beacon, the Measurement Report 1146 (Beacon Report) includes information indicating received power and a signal-to-noise ratio of the Beacon. Alternatively, in addition to or in place of this, information indicating received power and a signal-to-noise ratio of a Measurement Pilot or a Probe Response frame is included.

In a case where the Measurement Type 1145 indicates the Frame, the Measurement Report 1146 (Frame Report) includes information indicating average power of received frames. Alternatively, in addition to or in place of this, information indicating a signal-to-noise ratio and the numbers of received data frames and management frames is included.

In the present exemplary embodiment, as illustrated in FIG. 10, all pieces of switch destination information are included in a single element (switch destination link information element). Nevertheless, the frame format is not limited to this, and the communication apparatus 102 may independently include a plurality of elements as switch destination information. Specifically, in place of the switch destination link information element illustrated in FIG. 10, a MAC frame may include Link Reports 1111 to 111$m$ not as subelements but as elements. In this case, the Subelement ID field 1121 is replaced with an Element ID field or an Element ID field and an Element ID Extension field. An identifier corresponding to the element is stored into these fields. In a case where a Neighbor Report is diverted as a Link Report, 52 is included as an ID indicating a Neighbor Report.

In the present exemplary embodiment, a Link Report includes subelements of Measurement Reports 1131 to 113$n$ as information regarding a link, but the frame format is not limited to this. In place of the Measurement Reports, other elements that are defined in an IEEE 802.11 series standard and include information useful for a STA determining an acquisition possibility of a transmission chance may be included as subelements.

For example, an element such as BSS Load, BSS Average Access Delay, or BSS AC Access Delay that is defined in a standard formulated earlier than the IEEE 802.11ax standard may be included as a subelement. Alternatively, in place of or in addition to this, an element such as Extended BSS Load or HE BSS Load may be included as a subelement. It is sufficient that one or more elements of these elements are included in one Link Report as subelements. Alternatively, at least one of the above-described elements may be included as a subelement in a Measurement Report subelement.

In a case where the above-described elements are included as subelements, Element ID fields of these elements are replaced with Subelement ID fields. Then, an identifier to identify a subelement in a Measurement Report or Link Report is stored into a Subelement ID field. In a case where an Element ID Extension field exists, the Element ID Extension field is deleted. Nevertheless, an identifier corresponding to a combination of a value of the Element ID field and a value of the Element ID Extension field is stored into a Subelement ID field.

The BSS Load includes information indicating the number of STAs included in a targeted BSS, information indicating a rate of time in which a medium is busy, and information indicating a total remaining time out of a time of a medium usable by admission control.

The BSS Average Access Delay includes information indicating an average medium access delay time of an AP.

The BSS AC Access Delay includes information indicating an average medium access delay time of each access category (i.e., AC_BE, AC_BK, AC_VI, and AV_VO).

The Extended BSS Load includes information indicating the number of very high throughput (VHT) STAs having capability of a Multi-User (MU) beamformee, and associating with a targeted BSS. In addition to or in place of this, information indicating an unoccupied rate in a spacial stream domain in a time in which a medium is busy, and information indicating a temporal occupancy rate of a secondary 20-MHz band, 40-MHz band, or 80-MHz band are included.

The HE BSS Load includes information indicating the number of high efficiency (HE) STAs associating with a targeted BSS, and information indicating a rate of a time in which a medium is busy for communication between an AP and an HE STA. The HE STA refers to a STA supporting wireless communication complying with the IEEE 802.11ax standard. In addition to or in place of this, information indicating an unoccupied rate in a frequency domain in a time in which a medium is busy, and information indicating an unoccupied rate in a spacial stream domain in a time in which a medium is busy are included.

In addition to or in place of these elements, a Link Report or a Measurement Report may include, as subelements, elements not defined in a standard formulated earlier than the IEEE 802.11ax standard. In the present exemplary embodiment, one of such elements will be referred to as EHT BSS Load. The EHT BSS Load includes information indicating the number of EHT STAs associating with a targeted BSS. The EHT BSS refers to a STA supporting wireless communication complying with the IEEE 802.11be standard. The number of EHT STAs is calculated by counting STAs including at least one of EHT Capabilities and EHT Operation in a management frame. In addition to or in place of this, information indicating a rate of a time in which a medium is busy for communication between an AP and an EHT STA, and information indicating an unoccupied rate in a frequency domain in a time in which a medium is busy are included. In addition to or in place of these pieces of information, information indicating an unoccupied rate in a spacial stream domain in a time in which a medium is busy may be included.

Figure 6:
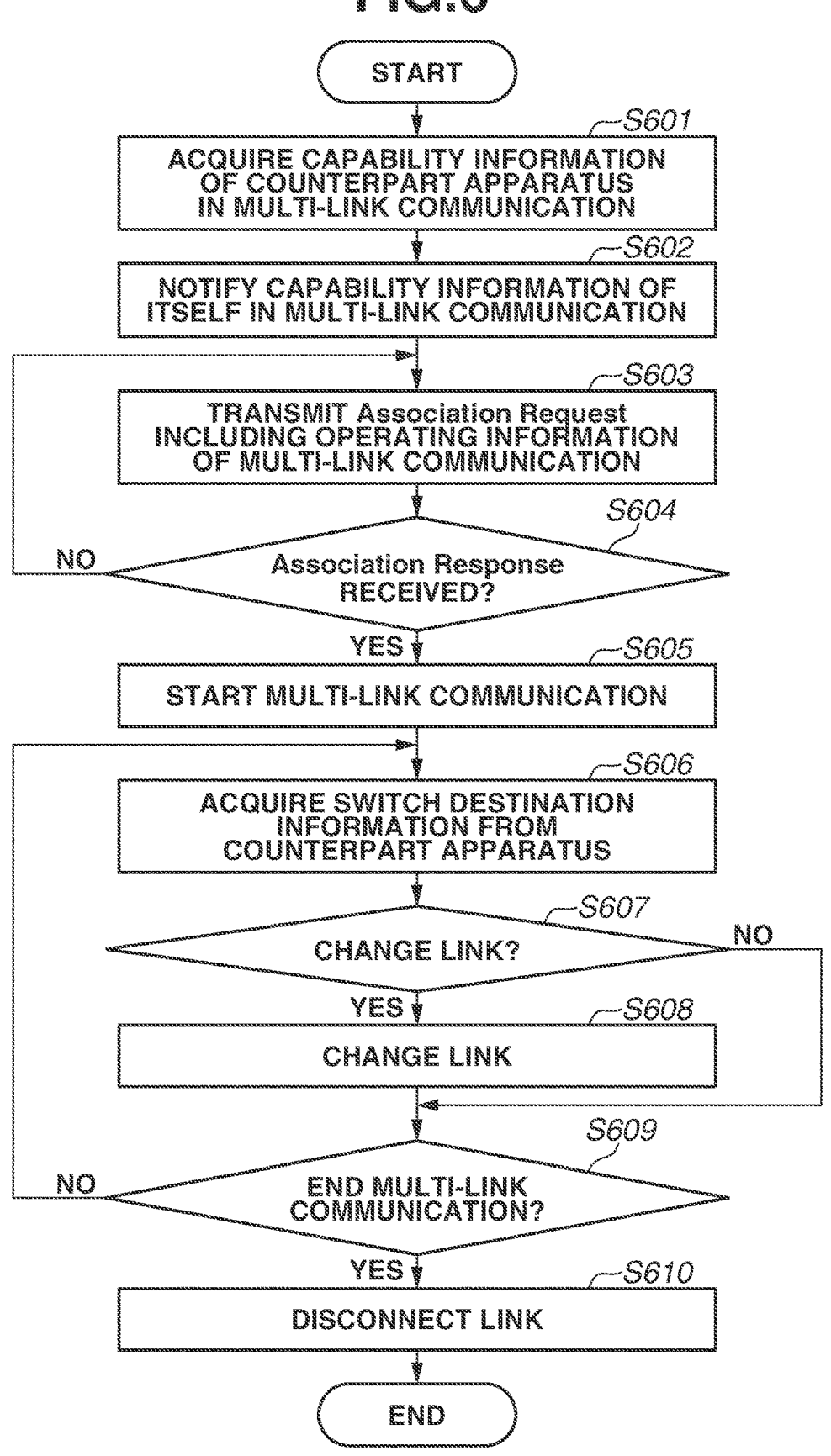
FIG. 6 is a flowchart illustrating processing to be executed by the communication apparatus 103 when executing multi-link communication.

FIG. 6 is a flowchart illustrating processing to be executed by the control unit 202 reading out and executing a computer program stored in the storage unit 201, in a case where the communication apparatus 103 performs multi-link communication.

The processing in this flowchart is started in accordance with the power of the communication apparatus 103 being turned on. Alternatively, the communication apparatus 103 may start the processing in this flowchart in accordance with a start instruction of multi-link communication being issued from a user or application. Alternatively, the communication apparatus 103 may start the processing in this flowchart in accordance with a data amount of data to be transmitted to the communication apparatus 102, becoming larger than or equal to a predetermined threshold value.

In step S601, first of all, the communication apparatus 103 acquires capability information of a counterpart apparatus in multi-link communication. Specifically, the communication apparatus 103 acquires capability information of the communication apparatus 102 by receiving a Beacon including a Multi-Link Capability Element that has been transmitted by the communication apparatus 102. Alternatively, the communication apparatus 103 may perform the processing in this step by receiving a Probe Response including a Multi-Link Capability Element that has been transmitted by the communication apparatus 102. In this case, the processing in this step and the processing in step S602 to be described below are swapped in order.

Next, in step S602, the communication apparatus 103 notifies capability information of itself in multi-link communication. Specifically, the communication apparatus 103 notifies capability information of itself in multi-link communication by transmitting a Probe Request including a Multi-Link Capability Element. In a case where capability information of a counterpart apparatus has been acquired before this step, capability information to be notified by itself may be determined based on the capability information of the counterpart apparatus. Specifically, the communication apparatus 103 may determine capability information to be notified in this step, in such a manner as not to exceed the capability of the communication apparatus 102. For example, a case where the communication apparatus 103 supports multi-link communication in the 2.4-GHz band, the 5-GHz band, and the 6-GHz band, and the communication apparatus 102 supports only multi-link communication in the 2.4-GHz band and the 5-GHz band will be considered. In this case, in this step, the communication apparatus 103 notifies that multi-link communication in the 2.4-GHz band and the 5-GHz band is supported, as capability information. In a case where the communication apparatus 103 transmits an Association Request including request information indicating a request regarding multi-link communication, to the communication apparatus 102 in step S603 to be described below, the processing in this step may be omitted.

Next, in step S603, the communication apparatus 103 transmits an Association Request including request information regarding multi-link communication. The request information to be transmitted in this step indicates information regarding multi-link communication requested by the communication apparatus 103 to be executed. In this step, the communication apparatus 103 may transmit an Association Request not including request information.

In step S604, the communication apparatus 103 determines whether an Association Response has been received from the communication apparatus 102 serving as an AP. In a case where the communication apparatus 103 has not received an Association Response (NO in step S604), the communication apparatus 103 makes a determination of NO in this step, and performs the processing in this step again. In a case where a determination of YES is not made in this step even if a predetermined time has elapsed since the Association Request was transmitted in step S603, the communication apparatus 103 notifies a user of an error and ends the processing of this flow. On the other hand, in a case where the communication apparatus 103 has received an Association Response (YES in step S604), the communication apparatus 103 makes a determination of YES in this step, and performs the processing in step S605.

In step S605, the communication apparatus 103 starts multi-link communication with the communication apparatus 102. In a case where an Association Response received in step S604 includes operating information regarding multi-link communication, the communication apparatus 103 starts multi-link communication that is based on the operating information. Alternatively, in a case where request information has been transmitted in step S603, and an Association Response including only information indicating permission has been received in step S604, the communication apparatus 103 starts multi-link communication that is based on the request information transmitted in step S603. In the present exemplary embodiment, in step S605, the communication apparatus 103 starts multi-link communication via a plurality of links established with the communication apparatus 102.

If the communication apparatus 103 starts multi-link communication with the communication apparatus 102, in step S606, the communication apparatus 103 acquires switch destination information of multi-link communication from the communication apparatus 102. Specifically, the communication apparatus 103 receives a Beacon including the switch destination link information element illustrated in FIG. 10, from the communication apparatus 102. The communication apparatus 103 may receive a Beacon including the switch destination link information element, from the communication apparatus 102 at every Beacon Interval of the communication apparatus 102. The Beacon to be received in this step may include a Multi-Link Capability Element indicating capability information of the communication apparatus 102 in multi-link communication, in addition to the switch destination link information element.

In the present exemplary embodiment, the communication apparatus 103 receives a Beacon in step S606, but a management frame to be received is not limited to this. The communication apparatus 103 may receive a Probe Response including a switch destination link information element. In this case, the communication apparatus 103 transmits a Probe request for requesting switch destination information, to the communication apparatus 102 at a timing between steps S605 and S606. The Probe Request to be transmitted by the communication apparatus 103 may include information indicating that switch destination information is requested. The Probe Response need not include a Multi-Link Capability Element indicating capability information of the communication apparatus 102 in multi-link communication.

In step S607, the communication apparatus 103 determines whether to change a link to be used for multi-link communication with the communication apparatus 102. Specifically, the communication apparatus 103 determines whether a link change instruction has been received from a user. In a case where a link change instruction has been received from a user (YES in step S607), the communication apparatus 103 makes a determination of YES in this step, and performs the processing in step S608. On the other hand, in a case where a link change instruction has not been received from a user (NO in step S607), the communication apparatus 103 makes a determination of NO in this step, and performs the processing in step S609. In this case, the communication apparatus 103 may display switch destination information indicated by the switch destination link information element acquired in step S606, on a display unit, and display a screen for inquiring of a user whether to change a link. Alternatively, the determination need not be made based on a user instruction, and the communication apparatus 103 may make the determination in this step based on the switch destination link information element acquired in step S606. For example, the communication apparatus 103 makes the determination in this step by comparing an acquisition possibility of a transmission chance of the communication apparatus 103 in a link used for data communication with the communication apparatus 102, and an acquisition possibility of a transmission chance in a different link indicated by a switch destination link information element. In this case, in a case where the acquisition possibility of a transmission chance of the communication apparatus 103 in the different link is higher than that in the currently-used link, the communication apparatus 103 makes a determination of YES in this step. On the other hand, in a case where the acquisition possibility of a transmission chance of the communication apparatus 103 in the different link is lower than that in the currently-used link, the communication apparatus 103 makes a determination of NO in this step. In this case, a link with a lower rate of a period in which a frequency channel used by the link is busy, with respect to a predetermined period is assumed to have a higher acquisition possibility of a transmission chance. In addition, a link with a higher signal-to-noise ratio is assumed to have a higher acquisition possibility of a transmission chance. Alternatively, a link with higher power of a signal received in a frequency channel used by the link is assumed to have a higher acquisition possibility of a transmission chance. In addition, a link with lower total power of noise and interference waves in a frequency channel used by the link is assumed to have a higher acquisition possibility of a transmission chance. In addition, a link with a smaller number of management frames or data frames received via a wireless network in which the link is established is assumed to have a higher acquisition possibility of a transmission chance. Alternatively, in a case where the communication apparatus 103 has not obtained desired throughput in a link used for data communication with the communication apparatus 102, the communication apparatus 103 makes a determination of YES in this step. The threshold value of a throughput may be set by a user, or may be preset in the communication apparatus 103.

In the present exemplary embodiment, after acquiring switch destination information in step S606, the communication apparatus 103 determines, in step S607, whether to change a link, but a processing flow is not limited to this. The communication apparatus 103 may first determine whether a link change instruction has been issued from the user, and then acquire switch destination information. After the processing in step S605, the communication apparatus 103 makes the determination in step S607 based on a user instruction, and in a case where the communication apparatus 103 makes a determination of Yes, the communication apparatus 103 transmits a Probe Request for requesting switch destination information to the communication apparatus 102. After that, in step S606, the communication apparatus 103 acquires switch destination information from the communication apparatus 102, and performs the processing in step S608 to be described below, based on the acquired switch destination information. In a case where the communication apparatus 103 makes a determination of NO in step S607 (NO in in step S607), the communication apparatus 103 performs the processing in step S609 to be described below.

In a case where the communication apparatus 103 makes a determination of YES in step S607 (YES in step S607), in step S608, the communication apparatus 103 performs link change processing. The link change processing specifically refers to switching a link used for data communication with the communication apparatus 102, to a different link. Alternatively, the link change processing is not limited to this, and another link may be added as a link to be used for data communication with the communication apparatus 102. Alternatively, the communication apparatus 103 may establish a new link with the communication apparatus 102, and switch or increase a link to be used for data communication with the communication apparatus 102. In addition to or in place of a link to be used for data communication with the communication apparatus 102, the communication apparatus 103 may perform change processing of a link for transmitting a control frame.

In step S608, the communication apparatus 103 transmits a link change request to the communication apparatus 102. The communication apparatus 103 starts data communication via a new link based on a response to the transmitted link change request being returned from the communication apparatus 102. Alternatively, in a case where a new link is established with the communication apparatus 102, the communication apparatus 103 may transmit an Association Request in step S608 similarly to step S604. In this case, the communication apparatus 103 starts data communication via a new link based on an Association Response being received from the communication apparatus 102.

In this case, the communication apparatus 103 may transmit a link change request or an Association Request via a frequency channel used for communication of a management frame with the communication apparatus 102. Alternatively, the communication apparatus 103 may transmit these signals via a frequency channel used for data communication.

In step S609, the communication apparatus 103 determines whether to end multi-link communication. Specifically, the communication apparatus 103 determines whether an end instruction of multi-link communication with the communication apparatus 102 has been issued from the user. In a case where an end instruction of multi-link communication has been issued from the user (YES in step S609), the communication apparatus 103 makes a determination of YES in this step, and executes the processing in step S610. On the other hand, in a case where an end instruction of multi-link communication has not been issued from the user (NO in step S609), the communication apparatus 103 performs the processing in step S606 again.

In step S610, the communication apparatus 103 disconnects the link with the communication apparatus 102. In this case, the communication apparatus 103 disconnects a plurality of links established with the communication apparatus 102, excluding one link. Specifically, the communication apparatus 103 transmits a Disassociation frame including information to make identifiable a link to be disconnected, to the communication apparatus 102. The communication apparatus 103 may transmit the Disassociation frame via the link maintained without being disconnected, or may transmit the Disassociation frame via any one of links to be disconnected. In the present exemplary embodiment, one link with the communication apparatus 102 is maintained, but disconnection processing is not limited to this. In this step, all links may be disconnected. If the communication apparatus 103 executes the processing in step S610, the communication apparatus 103 ends the processing of this flow.

The communication apparatus 103 may make the determination in step S609 not based on a user instruction but based on whether a link for multi-link communication with the communication apparatus 102 has been maintained. In this case, the communication apparatus 103 skips the processing in step S610. In a case where a plurality of links is maintained with the communication apparatus 102, the communication apparatus 103 makes a determination of NO in step S609. On the other hand, in a case where a plurality of links is not maintained with the communication apparatus 102, the communication apparatus 103 makes a determination of YES in step S609. Alternatively, in a case where one or more links are maintained with the communication apparatus 102, the communication apparatus 103 may make a determination of YES in step S609, and in a case where no link is maintained, the communication apparatus 103 may make a determination of NO in step S609.

Heretofore, as illustrated in FIG. 6, the communication apparatus 103 can change a link of multi-link communication with the communication apparatus 102 by acquiring switch destination information after starting multi-link communication with the communication apparatus 102. The communication apparatus 103 can thereby prevent a decline in throughput in multi-link communication with the communication apparatus 102, and enhance communication efficiency.

Figure 7:
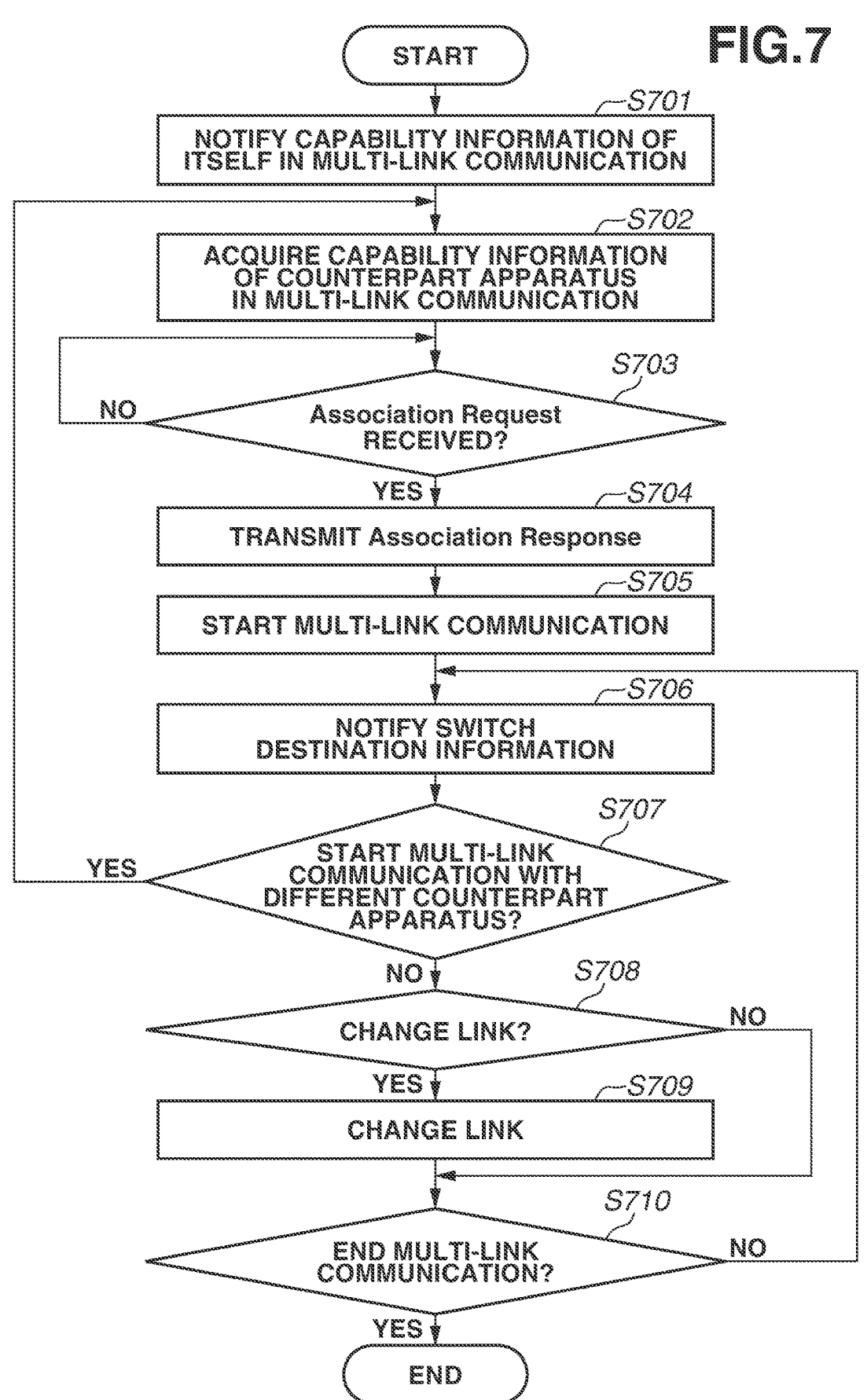
FIG. 7 is a flowchart illustrating processing to be executed by the communication apparatus 102 when executing multi-link communication.

FIG. 7 is a flowchart illustrating processing to be executed by the control unit 202 reading out and executing a computer program stored in the storage unit 201, in a case where the communication apparatus 102 performs multi-link communication.

The processing in this flowchart is started in accordance with the power of the communication apparatus 102 being turned on. Alternatively, the communication apparatus 102 may start the processing in this flowchart in accordance with a start instruction of multi-link communication being issued from a user or application. Alternatively, the communication apparatus 102 may start the processing in this flowchart in accordance with a data amount of data to be transmitted to the communication apparatus 103, becoming larger than or equal to a predetermined threshold value.

In step S701, first of all, the communication apparatus 102 notifies capability information of itself in multi-link communication. Specifically, the communication apparatus 102 notifies capability information of itself in multi-link communication by transmitting a Beacon including a Multi-Link Capability Element. Alternatively, the communication apparatus 102 may perform the processing in this step by transmitting a Probe Response including a Multi-Link Capability Element, in accordance with a Probe Response being received from the communication apparatus 103. In this case, the processing in this step and the processing in step S702 to be described below are swapped in order.

Next, in step S702, the communication apparatus 102 acquires capability information of a counterpart apparatus in multi-link communication. Specifically, the communication apparatus 102 acquires capability information of a counterpart apparatus in multi-link communication by receiving a Probe Request including a Multi-Link Capability Element. In a case where a Probe Request including a Multi-Link Capability Element has not been received from a counterpart apparatus, the processing in this step may be omitted.

If the communication apparatus 102 receives a Probe Request from the communication apparatus 103, the communication apparatus 102 returns a Probe Response as a response. In this case, in a case where a Beacon including a Multi-Link Capability Element is transmitted, the Probe Response need not include the element.

In step S703, the communication apparatus 102 determines whether an Association Request has been received from the communication apparatus 103. In a case where an Association Request has not been received (NO in step S703), the communication apparatus 102 makes a determination of NO in this step, and performs the processing in this step again. In a case where a determination of YES is not made in this step even if a predetermined time has elapsed since the Probe Response was transmitted in step S702, the communication apparatus 102 notifies a user of an error and ends the processing of this flow. On the other hand, in a case where an Association Request has been received (YES in step S703), the communication apparatus 102 makes a determination of YES in this step, and performs the processing in step S704.

Next, in step S704, the communication apparatus 102 transmits an Association Response as a response to the Association Request. In a case where request information has not been received from the communication apparatus 103 in step S703, the communication apparatus 102 transmits an Association Response including operating information in multi-link communication with the communication apparatus 103. In this case, the communication apparatus 102 determines a type of operating information to be included in the Association Response, based on the capability information of the communication apparatus 103 in multi-link communication. The operating information to be transmitted by the communication apparatus 102 with being included in the Association Response indicates information regarding multi-link communication to be actually performed between the communication apparatuses 102 and 103. Even in a case where the Association Request received in step S703 includes request information from the communication apparatus 103, the communication apparatus 102 may transmit an Association Response including operating information. In this case, the communication apparatus 102 determines a type of operating information to be included in the Association Response, based on the request information included in the Association Request received from the communication apparatus 103. Alternatively, in a case where request information has been received from the communication apparatus 103 in step S703, the communication apparatus 102 may transmit an Association Response including only information indicating whether to permit multi-link communication.

In step S705, the communication apparatus 102 starts multi-link communication with the communication apparatus 103. In a case where operating information regarding multi-link communication is included in the Association Response transmitted in step S704, the communication apparatus 102 starts multi-link communication that is based on the operating information. Alternatively, in a case where request information has been received in step S703, and an Association Response only including information indicating permission has been transmitted in step S704, the communication apparatus 102 starts multi-link communication that is based on the request information received in step S703. In the present exemplary embodiment, in step S705, the communication apparatus 102 starts multi-link communication via a plurality of links established with the communication apparatus 103.

If the communication apparatus 102 starts multi-link communication, in step S706, the communication apparatus 102 notifies switch destination information of multi-link communication. Specifically, the communication apparatus 102 transmits a Beacon including the switch destination link information element illustrated in FIG. 10. The communication apparatus 102 may transmit a Beacon including switch destination information, at every Beacon Interval. In this step, the communication apparatus 102 may transmit the capability information transmitted in step S701, in addition to the switch destination information.

In the present exemplary embodiment, in this step, the communication apparatus 102 transmits a Beacon including the switch destination information, but a management frame to be transmitted is not limited to this. The communication apparatus 102 may transmit a Probe Response including the switch destination information. In this case, the communication apparatus 102 determines whether a Probe Request has been received, in a step included between steps S705 and S706. If the communication apparatus 102 determines that a Probe Request has been received, the communication apparatus 102 performs the processing in step S706, and if the communication apparatus 102 determines that a Probe Request has not been received, the communication apparatus 102 determines whether a Probe Request has been received, again.

The communication apparatus 102 may transmit a Probe Response including different information, based on a counterpart apparatus that has transmitted a Probe Request. Specifically, in a case where the communication apparatus 102 has received a Probe Request transmitted from a counterpart apparatus (in the present exemplary embodiment, the communication apparatus 103) with which multi-link communication has already been started, the communication apparatus 102 transmits a Probe Response including switch destination information. In this case, the Probe Response need not include capability information regarding multi-link communication. On the other hand, in a case where the communication apparatus 102 has received a Probe Request transmitted from a counterpart apparatus with which multi-link communication has not been started, the communication apparatus 102 transmits a Probe Response not including switch destination information. In this case, the Probe Response includes capability information regarding multi-link communication. By changing information included in a Probe Response, in accordance with a transmission apparatus of a Probe Request, it is possible to reduce an amount of information to be communicated and reduce overhead.

The communication apparatus 102 may transmit a Probe Response including different information, based on whether the received Probe Request includes information indicating that switch destination information is requested. In a case where the communication apparatus 102 has received a Probe Request including information indicating a request for switch destination information, the communication apparatus 102 transmits a Probe Response including switch destination information. In this case, the Probe Response need not include capability information regarding multi-link communication. On the other hand, in a case where the communication apparatus 102 has received a Probe Request not including information indicating a request for switch destination information, the communication apparatus 102 transmits a Probe Response not including switch destination information. In this case, the Probe Response includes capability information regarding multi-link communication. In this manner, by changing information included in a Probe Response, in accordance with whether a Probe Request includes information indicating a request for switch destination information, it is possible to reduce an amount of information to be communicated and reduce overhead.

If the communication apparatus 102 notifies switch destination information, in step S707, the communication apparatus 102 determines whether to start multi-link communication with a different counterpart apparatus. The different counterpart apparatus refers to another communication apparatus with which multi-link communication has not been started. In the present exemplary embodiment, the different counterpart apparatus refers to another communication apparatus different from the communication apparatus 103. In a case where a start instruction of multi-link communication with another communication apparatus has been issued from the user (YES in step S707), the communication apparatus 102 makes a determination of YES in this step, and performs the processing in step S702. On the other hand, in a case where a start instruction of multi-link communication has not been issued from the user (NO in step S707), the communication apparatus 102 makes a determination of NO in this step, and performs the processing in step S708.

The determination in step S707 need not be made based on a user instruction, and the communication apparatus 102 may make the determination based on whether a Probe Request has been received from another communication apparatus. In this case, based on a Probe Request being received from another communication apparatus with which multi-link communication has not been started, the communication apparatus 102 makes a determination of YES in this step, and performs the processing in step S703. In a case where a Probe Request has not been received from another communication apparatus (NO in step S707), the communication apparatus 102 makes a determination of NO in this step, and performs the processing in step S708.

Alternatively, the communication apparatus 102 may make the determination in step S707 based on whether an Association Request has been received from another communication apparatus with which multi-link communication has not been started. In this case, based on an Association Request being received from another communication apparatus with which multi-link communication has not been started, the communication apparatus 102 makes a determination of YES in this step, and performs the processing in step S704. On the other hand, in a case where an Association Request has not been received from another communication apparatus, the communication apparatus 102 makes a determination of NO in this step, and performs the processing in step S708.

If the communication apparatus 102 receives a change request or an Association Request from the communication apparatus 103, the communication apparatus 102 returns a change response or an Association Response as a response.

Next, in step S708, the communication apparatus 102 determines whether to change a link to be used for multi-link communication with the communication apparatus 103. If the communication apparatus 102 receives a link change request from the communication apparatus 103 (YES in step S708), the communication apparatus 102 makes a determination of YES in this step, and performs the processing in step S709. On the other hand, in a case where a link change request has not been received from the communication apparatus 103 (NO in step S708), the communication apparatus 102 makes a determination of NO in this step, and performs the processing in step S710. Alternatively, the communication apparatus 102 may make the determination in step S708 based on whether an Association Request has been received from the communication apparatus 103, in addition to or in place of a change request. In a case where an Association Request has been received from the communication apparatus 103, the communication apparatus 102 makes a determination of YES in this step, and in a case where an Association Request has not been received, the communication apparatus 102 makes a determination of NO in this step.

In step S709, the communication apparatus 102 performs change processing of a link in multi-link communication with the communication apparatus 103. Specifically, the change processing of the link refers to switching of a link used for data communication of multi-link communication with the communication apparatus 103, to a different link already established with the communication apparatus 103. In addition to or in place of this, as a link to be used for data communication with the communication apparatus 103, a different link already established with the communication apparatus 103 may be used in addition to a currently-used link. Alternatively, the communication apparatus 102 may newly establish a link to be used for multi-link communication with the communication apparatus 103. In this case, the communication apparatus 102 may switch a link to be used for data communication with the communication apparatus 103, from a current link to a newly-established link. Alternatively, the communication apparatus 102 may use a newly-established link in addition to a current link.

The communication apparatus 102 starts multi-link communication via a new link with the communication apparatus 103.

In step S710, the communication apparatus 102 determines whether to end multi-link communication. Specifically, the communication apparatus 102 makes the determination in this step based on whether a link for multi-link communication with the communication apparatus 103 is maintained. In a case where a plurality of links is maintained with the communication apparatus 103 (NO in step S710), the communication apparatus 102 makes a determination of NO in this step, and performs the processing in step S706. On the other hand, in a case where a plurality of links is not maintained with the communication apparatus 103 (YES in step S710), the communication apparatus 102 makes a determination of YES in this step, and ends the processing of this flow. A link not being maintained refers to a link of which identification information is included in a Disassociation frame transmitted from the communication apparatus 103, or a link via which communication has not been performed for a predetermined time. Alternatively, in a case where one or more links are maintained with the communication apparatus 103, the communication apparatus 102 may make a determination of NO in step S710, and in a case where no link is maintained, the communication apparatus 102 may make a determination of YES in step S710.

In any step of step S705 and subsequent steps, in a case where the communication apparatus 102 receives a Disassociation frame from the communication apparatus 103, the communication apparatus 102 executes disconnection of a link. Specifically, the communication apparatus 102 determines that a link of which identification information is included in a Disassociation frame has been disconnected, and does not execute communication via the link.

In a case where the communication apparatus 102 executes multi-link communication with a plurality of counterpart apparatuses, the communication apparatus 102 makes the determination in step S710 based on links with all counterpart apparatuses with which multi-link communication is executed. In a case where a plurality of links is maintained with at least one counterpart apparatus, the communication apparatus 102 makes a determination of NO in step S710. On the other hand, in a case where a plurality of links is maintained with none of the counterpart apparatuses, the communication apparatus 102 makes a determination of YES in step S710.

Heretofore, as illustrated in FIG. 7, the communication apparatus 102 can notify switch destination information after starting multi-link communication with the communication apparatus 103. By notifying switch destination information, the communication apparatus 103 that has acquired the switch destination information can change a link of multi-link communication with the communication apparatus 102. The communication apparatus 102 can thereby prevent a decline in throughput in multi-link communication with the communication apparatus 103, and enhance communication efficiency.

In the present exemplary embodiment, the communication apparatus 103 transmits a Probe Request in step S706, but a communication apparatus is not limited to this. Another communication apparatus different from the communication apparatuses 102 and 103 may transmit a Probe Request to the communication apparatus 102. The different communication apparatus that transmits the Probe Request is assumed to have started multi-link communication with the communication apparatus 102. In this case, the communication apparatus 102 may transmit a Probe Response including switch destination information varying depending on a communication apparatus that has transmitted a Probe Request. For example, the communication apparatus 102 may transmit a Probe Response including switch destination information indicating information regarding a link established with the communication apparatus 103, in response to a Probe Request transmitted by the communication apparatus 103. At this time, a Probe Response transmitted to the communication apparatus 103 does not include switch destination information regarding a link established with another communication apparatus. In this case, the communication apparatus 102 transmits a Probe Response including switch destination information regarding a link established with the other communication apparatus, in response to a Probe Request transmitted by the other communication apparatus. The Probe Response to be transmitted to the other communication apparatus does not include switch destination information regarding a link established with the communication apparatus 103.

In a case where the communication apparatus 102 includes switch destination information into a Probe Response, the communication apparatus 102 may include only information regarding a link corresponding to a frequency channel supported by the communication apparatus 103, based on capability information regarding multi-link communication that has been received from the communication apparatus 103.

In the present exemplary embodiment, the communication apparatus 102 transmits information regarding all links that will become a switch destination, when transmitting switch destination information, but the processing is not limited to this. The communication apparatus 102 may transmit only information regarding a BSS, a frequency channel, or a link that has been determined to have a high transmission chance acquisition possibility of the communication apparatus 103 (STA). For example, the communication apparatus 102 determines a BSS of which a rate of a time in which a medium is busy is small, or a traffic with high priority such as AC_VO or AC_VI is small, as a BSS with a high transmission chance acquisition possibility of a STA. The communication apparatus 102 may similarly determine a frequency channel and a link. The communication apparatus 102 includes a BSSID of a BSS determined to have a high transmission chance acquisition possibility of a STA, into the BSSID field 1123. In this case, other fields of the Link Report may be omitted. The Channel Number field 1126 may be included to indicate a frequency channel used in the BSS. In a case where determination is made based on a frequency channel, only the Channel Number field 1126 may be included in place of the BSSID field 1123. Alternatively, the BSSID field 1123 indicating an ID of a BSS established by the communication apparatus 102 in the corresponding frequency channel may be included. In a case where determination is made based on a link, at least one of the Channel Number field 1126 indicating a frequency channel used in the corresponding link, and the BSSID field 1123 indicating a BSS may be included. In this case, the communication apparatus 102 selects an appropriate link as a switch destination of a link with the communication apparatus 103, and then transmits information regarding a switch destination candidate link to the communication apparatus 103. This reduces processing to be performed when the communication apparatus 103 selects a link serving as a switch destination.

In a case where the communication apparatus 102 executes multi-link communication or in a case where an execution instruction of multi-link communication has been issued, the communication apparatus 102 may include information regarding multi-link communication, into a MAC frame, and avoid including information regarding multi-link communication, into a MAC frame, in other cases. Especially in a case where multi-link communication is not executed, by avoiding including switch destination information into a Beacon or a Probe Response, it is possible to reduce overhead of the frame.

In the case of indicating switch destination information, by a frame format defined in a standard formulated earlier than the IEEE 802.11ax standard, development load of software and hardware that are form or analyze a communication apparatus can be reduced.

In the present exemplary embodiment, in a case where the communication apparatus 102 executes multi-link communication, the communication apparatus 102 includes switch destination information into at least one of a Beacon and a Probe Response. On the other hand, even in a case where the communication apparatus 102 executes multi-link communication, switch destination information is not included in an Association Response, Disassociation, Authentication, and De-Authentication. By avoiding including switch destination information into a frame to be used for establishment or disconnection of a link, and a frame to be used for authentication of a counterpart apparatus, the communication apparatus 102 can reduce overhead of frames. The communication apparatus 102 in only required to avoid including switch destination information into at least one of an Association Response, Disassociation, Authentication, and De-Authentication.

In the present exemplary embodiment, by acquiring information regarding a different link, via a link of multi-link communication that has already been established with the communication apparatus 102, the communication apparatus 103 selects whether to change a link currently used for data communication with the communication apparatus 102. In this case, the link change refers to link switch. Alternatively, in place of this, a link to be used for data communication may be increased. Alternatively, in a case where data communication with the communication apparatus 102 has already been performed via a plurality of links, a type of data to be transmitted via a certain link may be changed or a rate of data to be transmitted may be changed. The communication apparatus 103 acquires information regarding a different link, from the communication apparatus 102 via a link desired to be changed. Alternatively, information regarding a link may be acquired from the communication apparatus 102 via a link different from the link desired to be changed. In this case, as information regarding a link, information regarding a link used for the acquisition of information may be included.

In the present exemplary embodiment, when multi-link communication is ended, a Disassociation frame is transmitted from the communication apparatus 103 to the communication apparatus 102, but the processing is not limited to this. A Disassociation frame may be transmitted from the communication apparatus 102 to the communication apparatus 103. In this case, the communication apparatus 103 executes the processing in step S710 of FIG. 7 in place of steps S609 and S610 of FIG. 6. In addition, the communication apparatus 102 executes the processing in steps S609 and S610 of FIG. 6 in place of step S710 of FIG. 7.

In the present exemplary embodiment, the communication apparatuses 102 and 103 establish a plurality of links, start multi-link communication, and then communicate switch destination information. Nevertheless, a processing flow is not limited to this, and the communication apparatuses 102 and 103 may establish a single link and then communicate switch destination information. Specifically, in step S605 of FIG. 6 and step S705 of FIG. 7, communication via the established single link may be started instead of multi-link communication. In this case, the communication apparatuses 102 and 103 may newly establish a link in the link change in step S608 of FIG. 6 and step S709 of FIG. 7, and start multi-link communication.

At least part or all of the processing to be executed by the communication apparatus 102 and the communication apparatus 103 in the flowcharts illustrated in FIGS. 6 and 7 may be implemented by hardware. In a case where the processing is implemented by hardware, it is sufficient that a dedicated circuit is generated on a field programmable gate array (FPGA) from a computer program for implementing each step, by using a predetermined compiler, for example, and the dedicated circuit is used. In addition, a gate array circuit may be formed and implemented as hardware similarly to the FPGA. In addition, the processing may be implemented by an application specific integrated circuit (ASIC).

An exemplary embodiment of the present invention can also be implemented by processing of supplying a program for implementing one or more functions of the above-described exemplary embodiment, to a system or an apparatus via a network or a storage medium, and one or more processors in a computer of the system or the apparatus reading out the program and executing the program. In addition, an exemplary embodiment of the present invention can also be implemented by a circuit (for example, ASIC) implementing one or more functions.

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, by appropriately communicating information regarding a link to be established with a different communication apparatus in a frequency channel complying with an IEEE 802.11 series standard, it becomes possible to ensure the compatibility of a frame.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus that can execute multi-link communication complying with an Institute of Electrical and Electronics Engineers (IEEE) 802.11 series standard by a first link using a first frequency channel and a second link using a second frequency channel, comprising:

at least one memory that stores a set of instructions; and at least one processor that executes the instructions, the instructions, when executed, causing the communication apparatus to perform operations comprising:

communicating a media access control (MAC) frame including a first element including information regarding the second link and a second element including information regarding a service set identifier (SSID) in the first frequency channel, the MAC frame including a header and a body, the first element and the second element being included in the body, and the first element being arranged later than the second element in the body, wherein the first element includes an Element ID field and a Length field, and the Element ID field is a field positioned in front among a plurality of fields included in the first element.

2. The communication apparatus according to claim 1, wherein the information regarding the second link includes identification information regarding the second link.

3. The communication apparatus according to claim 2, wherein the identification information is a basic service set identifier (BSSID) regarding the second link.

4. The communication apparatus according to claim 2, wherein the identification information is a Link ID of the second link.

5. The communication apparatus according to claim 1, wherein the information regarding the second link is included later than an HE 6-GHz Band Capabilities element in the MAC frame.

6. The communication apparatus according to claim 1, wherein the information regarding the second link is included later than a Supported Rates and BSS Membership Selectors element in the MAC frame.

7. The communication apparatus according to claim 1, wherein the first element includes a first field including information regarding the first link and the information regarding the second link, and the first field is arranged later than the Length field.

8. A communication method that can execute multi-link communication complying with an Institute of Electrical and Electronics Engineers (IEEE) 802.11 series standard by a first link using a first frequency channel and a second link using a second frequency channel, comprising:

communicating a media access control (MAC) frame including a first element including information regarding the second link and a second element including information regarding a service set identifier (SSID) in the first frequency channel, the MAC frame including a header and a body, the first element and the second element being included in the body, and the first element being arranged later than the second element in the body, wherein the first element includes an Element ID field and a Length field, and the Element ID field is a field positioned in front among a plurality of fields included in the first element.

9. A non-transitory computer-readable storage medium for storing a program for causing a computer to execute a communication method that can execute multi-link communication complying with an Institute of Electrical and Electronics Engineers (IEEE) 802.11 series standard comprising:

communicating a media access control (MAC) frame including a first element including information regarding the second link and a second element including information regarding a service set identifier (SSID) in the first frequency channel, the MAC frame including a header and a body, the first element and the second element being included in the body, and the first element being arranged later than the second element in the body, wherein the first element includes an Element ID field and a Length field, and the Element ID field is a field positioned in front among a plurality of fields included in the first element.

\* \* \* \* \*